United States Patent [19]

Daniels et al.

[11] Patent Number: 5,784,069
[45] Date of Patent: Jul. 21, 1998

[54] BIDIRECTIONAL CODE CONVERTER

[75] Inventors: Andrew M. Daniels, Menlo Park; Yung-Fong Frank Tang, Sunnyvale, both of Calif.; Peter K. Edberg, Eugene, Oreg.; John I. McConnell, Menlo Park, Calif.

[73] Assignee: Apple Computer, Inc., Cupertino, Calif.

[21] Appl. No.: 527,827

[22] Filed: Sep. 13, 1995

[51] Int. Cl.$^6$ ............................................. G06F 7/00
[52] U.S. Cl. .......................... 345/467; 704/8; 707/542
[58] Field of Search .................................. 395/758, 899; 345/467; 704/8; 707/526, 542

[56] References Cited

U.S. PATENT DOCUMENTS

| | | |
|---|---|---|
| 5,091,950 | 2/1992 | Ahmed. |
| 5,170,445 | 12/1992 | Nelson et al.. |
| 5,309,358 | 5/1994 | Andrews et al.. |
| 5,477,451 | 12/1995 | Brown et al.. |

OTHER PUBLICATIONS

Trans–European Research and Education Networking Association (TERENA), "Alpha Test Release of the C3 System for Coded Character Set Conversion", Dec. 15, 1994, pp. 1–3.

Bauxeens et al., "Standarization as a Prerequisite for Accessibility of Electronic Text Information for Persons Who Cannot Use Printed Material", *Transactions on Rehabilitation Engineering*, IEEE, vol. 3, iss. 1, pp. 84–89, Mar. 1995.

Davis, M., et al., "International Support in Applications and Systems Software: Part Two", vol. 2, No. 4, Jul. 1995, pp. 14, 16–17, 22–24.

Davis, M., et al., "Unicode", Proceedings of the International Conference on Systems, Man and Cybernetics, Nov. 4–7, 1990, pp. 499–504.

IBM Technical Disclosure Bulletin, "Validation of Double–Byte Character Sets Text for Prompting in a Language–Sensitive Editing System", vol. 37, No. 11, Nov., 1994, pp. 11–14.

IBM Technical Disclosure Bulletin, "Technique to Provide NLS Code Page Conversion with Roundtrip Fidelity", vol. 35, No. 5, Oct., 1992, p. 273.

Unicode Consortium "The Unicode Standard", Version 1.0, vol. 1, 1991.

Becker, Joseph D. "*Multilingual Word Processing*", vol. 251, Issue #1 Scientific American, Jul. 1984, USA.

Peter Edberg, "Background information–mapping tables for the Mac™ OS", Apr. 15, 1995, (Internet posting at FTP://Unicode.org/pub/Mapping Tables/Apple).

Primary Examiner—William M. Treat
Attorney, Agent, or Firm—Beyer & Weaver, LLP

[57] ABSTRACT

A code conversion system that takes direction into consideration when converting characters from a source character encoding to a target character encoding is disclosed. The code conversion system is able to map a single source character or a sequence of characters to either a single target character or a sequence of target characters. By determining or resolving the direction of the characters being converted, the code conversion system can then utilize the determined or resolved direction of the characters to ensure that the correct mapping to the target character encoding is obtained.

26 Claims, 25 Drawing Sheets

| STATE | OS | NS | DD | HD | JL(f) | JV(f) | JT | LD | PS | CC | ISS | ASS | NU |
|---|---|---|---|---|---|---|---|---|---|---|---|---|---|
| 0 = END | END →0 | END →0 | END →0 | END →0 | END →0 | END →0 | END →0 | END →0 | END →0 | END →0 | END →0 | END →0 | END →0 |
| 1 = START | AvdMark →2 | AdvMarkS →2 | AdvMarkS →2 | AdvMarkS →2 | AdvMarkS →2 | AdvMark →2 | AdvMark →2 | AdvMark →3 | AdvMark →2 | AdvMark →0 | AdvMarksISS →0 | AdvMarksASS →0 | Error →0 |
| 2 = TE NS | END →0 | AdvMarkS →2 | AdvMarkS →2 | AdvMarkS →2 | END →0 | END →0 | END →0 | END →0 | END →0 | END →0 | END →0 | END →0 | END →0 |
| 3 = LD | END →0 | END →0 | END →0 | END →0 | END →0 | END →0 | END →0 | Adv →4 | Adv →5 | END →0 | END →0 | END →0 | END →0 |
| 4 = LD LD+ | END →0 | AdvMarkS →2 | END →0 | END →0 | END →0 | END →0 | END →0 | Adv →4 | Adv →5 | END →0 | END →0 | END →0 | END →0 |
| 5 = LD+PS | END →0 | END →0 | END →0 | END →0 | END →0 | END →0 | END →0 | AdvMark →6 | END →0 | END →0 | END →0 | END →0 | END →0 |
| 6 = LD+ FSLD+ | END →2 | AdvMarkS →2 | AdvMarkS →2 | AdvMarkS →2 | END →0 | END →0 | END →0 | AdvMark →6 | END →0 | END →0 | END →0 | END →0 | END →0 |
| 7 = JL+ | END →0 | AdvMarkS →2 | AdvMarkS →2 | AdvMarkS →2 | AdvMark →7 | AdvMark →8 | END →0 | END →0 | END →0 | END →0 | END →0 | END →0 | END →0 |
| 8 = JL+JV+ | END →0 | AdvMarkS →2 | END →0 | END →0 | END →0 | AdvMark →8 | AdvMark →9 | END →0 | END →0 | END →0 | END →0 | END →0 | END →0 |
| 9 = JL+JV+JT+ | END →0 | AdvMarkS →2 | AdvMarkS →2 | AdvMarkS →2 | END →0 | END →0 | AdvMark →9 | END →0 | END →0 | END →0 | END →0 | END →0 | END →0 |

|        | START       | sDIR          | OR         | SL          | SR          | AL          | L+AN        | L+EN        |
|--------|-------------|---------------|------------|-------------|-------------|-------------|-------------|-------------|
| LR     | SL,L        | START,L       | OR,G       | SL,L        | SL,L        | SL,L        | SL,L        | SL,L        |
| RL     | SR,R        | START,R       | OR,G       | SR,R        | SR,R        | SR,R        | SR,R        | SR,R        |
| AL     | AL,L        | START,R       | OR,G       | AL,R        | AL,R        | AL,R        | AL,R        | AL,R        |
| LRE    | SL,push,L   | START,L       | SL,push,L  | SL,push,L   | SL,push,L   | SL,push,L   | SL,push,L   | SL,push,L   |
| RLE    | SR,push,R   | START,R       | SR,push,R  | SR,push,R   | SR,push,R   | SR,push,R   | SR,push,R   | SR,push,R   |
| LRO    | OR,push,L   | START,L       | OR,push,L  | OR,push,L   | OR,push,L   | OR,push,L   | OR,push,L   | OR,push,L   |
| RLO    | OR,push,R   | START,R       | OR,push,R  | OR,push,R   | OR,push,R   | OR,push,R   | OR,push,R   | OR,push,R   |
| PDF    | S(G),pop,G  | error         | S(G),pop,G | S(G),pop,G  | S(G),pop,G  | S(G),pop,G  | S(G),pop,G  | S(G),pop,G  |
| AN     | (G)+AN,L    | sDIR,•        | OR,G       | L+AN,L      | R+AN,L      | AL+Num,L    | L+AN,L      | L+AN,L      |
| EN     | (G)+EN,L    | sDIR,•        | OR,G       | L+EN,L      | R+EN,L      | AL+Num,L    | L+EN,L      | L+EN,L      |
| ET     | s#=ET,•     | sDIR,•        | OR,G       | sL+N,•      | sR+ET,•     | sA+N,•      | sLAN+T,•    | sLEN+N,•    |
| ES     | s(G)+N,•    | sDIR,•        | OR,G       | sL+N,•      | sR+N,•      | sA+N,•      | sLAN+S,•    | sLEN+N,•    |
| CS     | s(G)+N,•    | sDIR,•        | OR,G       | sL+N,•      | sR+N,•      | sA+N,•      | sLAN+N,•    | sLEN+N,•    |
| ON     | s(G)+N,•    | sDIR,•        | OR,G       | sL+N,•      | sR+N,•      | sA+N,•      | sLAN+N,•    | sLEN+N,•    |
| BS     | S(G),G      | sDIR,•        | reset      | reset       | reset       | reset       | reset       | reset       |
| Notes: |             | scan for base | override   | strong left | strong right| arabic letter | strong left+ | strong left+ |
|        |             | direction     |            |             |             |             | arabic num  | euro num    |

| 15B | 15C | 15D |

FIG. 15C

| R+AN | R+EN | AL+Num | sL+N | sR+N | sR+ET | sA+N | s#+ET | sLAN+N |
|---|---|---|---|---|---|---|---|---|
| SL,L | SL,L | SL,L | SL,L | SR,G | SR,G | AL,G | S(G),G | L+AN,G |
| SR,R | SR,R | SR,R | SL,G | SR,R | SR,R | AL,R | S(G),G | L+AN,R |
| AL,R | AL,R | AL,R | SL,G | SR,R | SR,R | AL,R | S(G),G | L+AN,R |
| SL,push,L | SL,push,L | SL,push,L | SL,L | SR,G | SR,G | AL,G | S(G),G | L+AN,G |
| SR,push,R | SR,push,R | SR,push,R | SL,G | SR,R | SR,R | AL,R | S(G),G | L+AN,R |
| OR,push,L | OR,push,L | OR,push,L | SL,L | SR,G | SR,G | AL,G | S(G),G | L+AN,G |
| OR,push,R | OR,push,R | OR,push,R | SL,G | SR,R | SR,R | AL,R | S(G),G | L+AN,R |
| S(G),pop,G | S(G),pop,G | S(G),pop,G | SL,G | SR,G | SR,G | AL,G | S(G),G | L+AN,G |
| R+AN,L | R+AN,L | AL+Num,L | SL,L | SR,R | SR,R | AL,R | S(G),G | L+AN,R |
| R+EN,L | R+EN,L | AL+Num,L | SL,L | SR,G | SR,L | AL,R | S(G),L | L+AN,G |
| sRAN+T,• | R+EN,L | sALN+N,• | sL+N,• | sR+N,• | sR+ET,• | sA+N,• | S#+ET,• | sLAN+N,• |
| sRAN+N,• | sREN+S,• | sALN+N,• | sL+N,• | sR+N,• | sR+N,• | sA+N,• | s(G)+N,• | sLAN+N,• |
| sRAN+N,• | sREN+S,• | sALN+S,• | sL+N,• | sR+N,• | sR+N,• | sA+N,• | s(G)+N,• | sLAN+N,• |
| SRAN+N,• | sREN+N,• | sALN+N,• | sL+N,• | sR+N,• | sR+N,• | sA+N,• | s(G)+N,• | sLAN+N,• |
| reset | reset | reset | SL,G | SR,G | SR,G | AL,G | S(G),G | L+AN,G |
| strong right+ | strong right+ | arabic letter+ | lookaheads for | random | neutrals | | bot+euro term | |
| arabic num | euro num | any num | | | | | very special | |

| sLEN+N | sRAN+N | sREN+N | sALN+N | sLAN+T | sRAN+T | sLAN+S | sREN+S | sALN+S |
|---|---|---|---|---|---|---|---|---|
| L+EN,L | R+AN,G | R+EN,G | AL+Num,G | L+AN,G | R+AN,G | L+AN,G | R+EN,G | AL+Num,G |
| L+EN,G | R+AN,R | R+EN,R | AL+Num,R | L+AN,R | R+AN,R | L+AN,R | R+EN,R | AL+Num,R |
| L+EN,G | R+AN,R | R+EN,R | AL+Num,R | L+AN,R | R+AN,R | L+AN,R | R+EN,R | AL+Num,R |
| L+EN,L | R+AN,G | R+EN,G | AL+Num,G | L+AN,G | R+AN,G | L+AN,G | R+EN,G | AL+Num,G |
| L+EN,G | R+AN,R | R+EN,R | AL+Num,R | L+AN,R | R+AN,R | L+AN,R | R+EN,R | AL+Num,R |
| L+EN,L | R+AN,G | R+EN,G | AL+Num,G | L+AN,G | R+AN,G | L+AN,G | R+EN,G | AL+Num,G |
| L+EN,G | R+AN,R | R+EN,R | AL+Num,R | L+AN,R | R+AN,R | L+AN,R | R+EN,R | AL+Num,R |
| L+EN,G | R+AN,R | R+EN,R | AL+Num,R | L+AN,R | R+AN,R | L+AN,R | R+EN,R | AL+Num,R |
| L+EN,G | R+AN,R | R+EN,R | AL+Num,R | L+AN,L | R+AN,L | L+AN,L | R+EN,L | AL+Num,L |
| L+EN,L | R+AN,R | R+EN,R | AL+Num,R | L+AN,L | R+AN,L | L+AN,L | R+EN,L | AL+Num,L |
| sLEN+N,* | sRAN+N,* | sREN+N,* | sALN+N,* | sLAN+T,* | sRAN+T,* | sLAN+N,* | sREN+N,* | sALN+N,* |
| sLEN+N,* | sRAN+N,* | sREN+N,* | sALN+N,* | sLAN+N,* | sRAN+N,* | sLAN+N,* | sREN+S,* | sALN+S,* |
| sLEN+N,* | sRAN+N,* | sREN+N,* | sALN+N,* | sLAN+S,* | sRAN+N,* | sLAN+S,* | sREN+S,* | sALN+S,* |
| sLEN+N,* | sRAN+N,* | sREN+N,* | sALN+N,* | sLAN+N,* | sRAN+N,* | sLAN+N,* | sREN+N,* | sALN+N,* |
| L+EN,G | R+AN,G | R+EN,G | AL+NUM,G | L+AN,G | R+AN,G | L+AN,G | R+EN,G | AL+NUM,G |
| | | | | euro terms | | separators | | |
| | | | | lookaheads for | numeric | punctuation | | |

1511

5,784,069

BIDIRECTIONAL CODE CONVERTER

BACKGROUND OF THE INVENTION

1. Field of the Invention

The present invention relates to a system for converting between character codes for written or displayed text, and more particularly, to a code converter for converting between one character set and another character set.

2. Description of the Related Art

Computers and other electronic devices typically use text to interact with users. The text is usually displayed on a monitor or some other type of display device. Because the text must be represented in digital form inside the computer or other electronic device, a character set encoding must be used. Generally speaking, a character set encoding operates to encode each character of the character set with a unique digital representation. The characters (which are encoded) correspond to letters, numbers and various text symbols are assigned numeric codes for use by computers or other electronic devices. The most popular character set for use with computers and other electronic devices is the American Standard Code for Information Exchange (ASCII). ASCII uses 7-bit sequences for its encodings. In other countries, different character sets are used. In Europe, the dominant character encoding standards are the ISO 8859-X family, especially ISO 8859-1 (called "Latin-1") developed by the International Standards Organization (ISO). In Japan, the dominant character encoding standard is JIS X0208 where JIS refers to the Japanese Information Standard and was developed by Japan Standards Association (JSA). Examples of other existing character sets include Mac™ OS Standard Roman encoding (by Apple Computer, Inc.), Shift-JIS (Japan), Big5 (Taiwan), and many more.

With the ongoing globalization of business and networks, it has become important for computers or other electronic devices to be able to handle multiple character encodings. For example, the same computer or electronic device may be used by persons of different nationalities who wish to interact with the computer or other electronic device in a different language. For each such language a different character set encoding is usually needed. However, character sets for the same language can also differ.

There is also a need to be able to convert from one character set encoding to another encoding. For example, a user in France using ISO 8859-1 may want to send an electronic mail message in French to a user in Israel who is using ISO 8859-8. Because the sender and receiver are using different character set encodings, the non-ASCII characters in the message will be garbled for the user in Israel. Ideally, one of the computers or electronic devices would convert from one character set to another character set. This has been achieved to a limited extent between a few character sets, but is largely not possible with modern computers or electronic devices. Code conversion is made difficult because of the numerous different character standards and the often conflicting or inconsistent national standards.

The Unicode™ standard (hereafter simply Unicode or Unicode standard) was developed to provide an international character encoding standard. The designers of the Unicode standard wanted and did provide a more efficient and flexible method of character identification. The Unicode standard includes the character encodings for characters of all major International Standards approved and published before Dec. 31, 1990, as well as other characters not in previous standards. The characters are encoded in the Unicode standard without duplication. The codes within the Unicode standard are 16-bits (or 2 bytes) wide.

A character code standard such as the Unicode standard facilitates code conversion and enables the implementation of useful processes operating on textual data. For example, in accordance with the above example, the computer or other electronic device in France can transmit Unicode characters and the computer or other electronic device in Israel can convert the Unicode characters it receives into a Hebrew based character set that is compatible with the computer or other electronic device in Israel.

Below is a general overview discussion of the Unicode standard. For additional detail about the Unicode standard, see, e.g., The Unicode Standard, Worldwide Character Encoding, Version 1.0, Addison-Wesley 1991 (Version 1.1 is also available for additional details), both versions of which are hereby incorporated by reference in their entirety.

The design of the Unicode encoding scheme is independent of the design of basic text processing algorithms, with the exception of directionality. Unicode implementations are assumed to contain suitable text processing and/or rendering algorithms. For convenience, all codes in the Unicode standard are grouped by a linguistic and functional category, though all the codes in the Unicode standard are equally accessible. "The code space in the Unicode standard is divided into six zones: General Scripts (alphabetic and other scripts that have relatively small character sets), Symbols, CJK (Chinese, Japanese, and Korean) Auxiliary, CJK ideographs, Private Use and Compatibility. The General Script zone covers alphabetic or syllabic scripts such as Latin, Cyrillic, Greek, Hebrew, Arabic, Devanagari and Thai. The Symbol zone includes a large variety of characters for punctuation, mathematics, chemistry, dingbats, and so on. The CJK Auxiliary zone includes punctuation, symbols, Kana, Bopomofo, and single and composite Hangul. The CJK Ideographic zone provides space for over 20,000 ideographic characters or characters from other scripts. The Private Use zone is used for defining user- or vendor-specific graphic characters. The Compatibility Zone contains characters from widely used corporate and national standards that have other canonical representations in Unicode encoding." The Unicode Standard, supra, Version 1.0, p. 13.

The Unicode standard provides character properties and control characters. Character properties are useful for use in parsing, sorting, and other algorithms requiring semantic knowledge about the code points within the Unicode encoding. The character properties identified by the Unicode standard include: digits, numbers, space characters, non-spacing marks, and direction. The Unicode characters are grouped based on the characters properties. Digits, numbers and space characters are well known. The non-spacing marks group houses non-spacing marks, and the direction group houses the direction characters.

Non-spacing marks (e.g., accent marks in Greek and Roman scripts, vowel marks in Arabic and Devanagari) do not appear linearly in the final rendered text. In a Unicode character code sequence, all such characters follow the base character which they modify, or the character after which they would be articulated in phonetic order (for example, Roman "Á" is stored as "A" when not stored in a precomposed form). When rendered, these characters (i.e., non-spacing marks) are intended to be positioned relative to the preceding base character in some manner, and not themselves occupy a spacing position.

Control characters are encoded in the Unicode standard, but are not themselves graphic characters. These control characters can, for example, be used for indicating a horizontal tab, or supplying additional information about text such as formatting attributes or structure, or for controlling by directional formatting. Because the Unicode standard also provides bidirectional character ordering, the Unicode encoding scheme also includes characters to specify changes in direction. For example, Greek, Roman and Thai have a dominant direction of left-to-right, while Arabic and Hebrew have a dominant direction of right-to-left. The use of control characters to change directions will sometimes be needed by the user or system, for example, when left-to-right characters are mixed with right-to-left characters.

One problem with conventional code converters is that they do not take direction into consideration when converting characters of a source character set to characters of a target character set. This can lead to erroneous conversions because some characters sets are ordered from left-to-right, while others are ordered from right-to-left. This typically occurs when converting to a target character which has two equivalent characters for a given source encoding, with the only difference being the direction. In this case, to map the correct target character, the direction of the source character must be known. The conventional code converters are also unsatisfactory because they are not flexible enough to handle certain character sets (e.g., Unicode) that include characters corresponding to languages that are ordered (directional) from left-to-right as well as languages that are ordered from right-to-left. For example, a Unicode character string in which the ordering or directionality of the characters changes within the Unicode character string would not be correctly converted by conventional code converters because the conventional code converters assume a fixed direction for the entire character string.

Thus, there is a need for a code converter that is able to convert characters from a source character set to characters of a target character set while taking the direction of the characters into consideration.

SUMMARY OF THE INVENTION

Broadly speaking, the invention is a code conversion system that takes direction into consideration when converting characters from a source character encoding to a target character encoding.

The code conversion system is able to map a single source character or a sequence of characters to either a single target character or a sequence of target characters. By determining or resolving the direction of the characters being converted, the code conversion system can then utilize the determined or resolved direction of the characters to ensure that the correct mapping to the target character encoding is utilized. Hence, with the invention correct code conversion is achieved even when the directionality of the characters within a source string varies. The invention can be implemented in numerous ways, including as a method, apparatus or system, or on a computer readable medium.

As a code conversion system for converting a source string to a target string, an embodiment of the invention includes a converter for controlling the conversion of the input string having a source character encoding into the target string having a target character encoding, the input string including a plurality of characters; a scanner for determining a direction of the characters in the input string; a mapping table for storing target encodings for characters of the source encoding; and a lookup handler for looking up in said mapping table a conversion code associated with a target character encoding for each of the characters in the input string based on the direction and the source encoding for the characters in the input string. Preferably, the scanner further divides the input string into text elements with each text element including one or more characters of the input string, the scanner determines the direction of the text elements, the mapping table stores target encodings for text elements of the source encoding, and the lookup handler looks up the target character encoding for each of the text elements based on the direction and the source encoding for the characters in the text elements. The embodiment may also include a fallback handler for providing fallback conversion codes in certain cases, when said lookup handler is unable to provide a conversion code for one or more text elements.

As a method for converting a source string into a target string, an embodiment of the invention performs the operations of: receiving a source string having a first character encoding, the source string including a plurality of source characters; determining a direction for the source characters of the source string; looking up in a mapping table a conversion code associated with a second character encoding for each of the source characters based on the first character encoding and the direction determined; and combining the conversion codes for the source characters so as to form a target string of the second character encoding.

As a computer readable medium containing program instructions for converting a source string into a target string, an embodiment of the invention includes: computer readable code configured to cause a computer to effect receiving a source string having a first character encoding; computer readable code configured to cause a computer to effect determining a direction for each of the source characters in the source string and to effect dividing the source string into text elements, each text element including one or more characters of the source string; computer readable code configured to cause a computer to effect looking up in a conversion code associated with a second character encoding for each of the text elements; and computer readable code configured to cause a computer to effect combining the conversion codes for the text elements so as to form a target string of the second character encoding.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 14 is a table which represents both a preferred layout and the information which would be stored in the scanner table according to a preferred embodiment of the invention;

FIGS. 15B–15D are tables which represent a preferred layout of bidirectional state tables according to the invention;

DETAILED DESCRIPTION OF THE INVENTION

Figure 1:
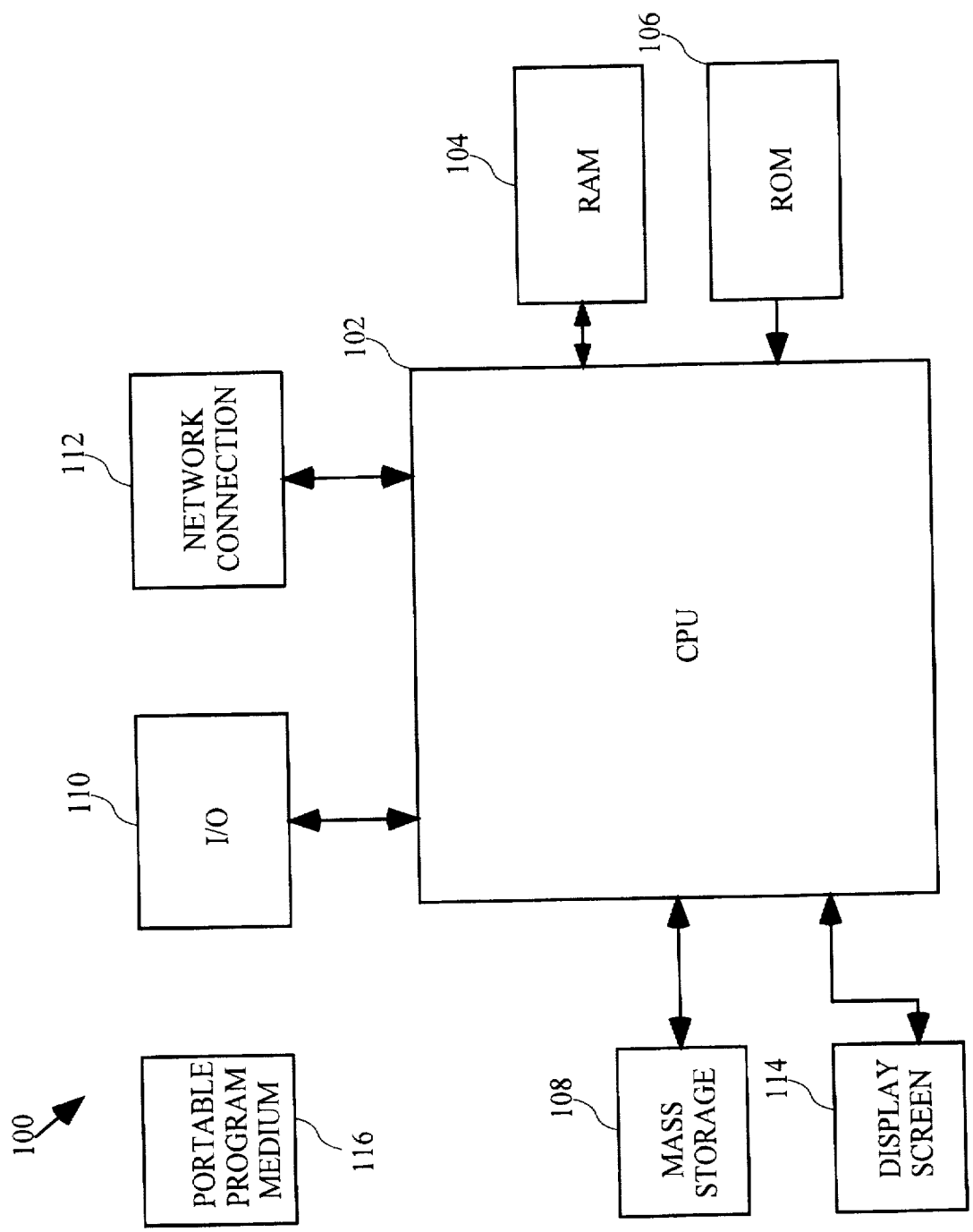
FIG. 1 is block diagram of a representative computer system in accordance with the invention.

Embodiments of the invention are discussed below with reference to the drawings. However, those skilled in the art will readily appreciate that the detailed description given herein with respect to these figures is for explanatory purposes as the invention extends beyond these limited embodiments.

A code conversion system according to the invention takes direction into consideration when converting characters from a source character encoding to a target character encoding. The code conversion system is able to map a single source character or a sequence of characters to either a single target character or a sequence of target characters. By determining or resolving the direction of the characters being converted, the code conversion system can then utilize the determined or resolved direction of the characters to ensure that the correct mapping to the target character encoding is obtained. Hence, with the invention correct code conversion is achieved even when the directionality of the characters within a source string varies.

The invention is particularly useful when Arabic or Hebrew based character sets are utilized because they have a right-to-left direction. The invention provides flexibility to handle either direction as well as the capability to change directions midstream. The capability to change directions midstream is important in cases where Arabic or/and Hebrew are used with the other character sets having the more common left-to-right direction. One example of the use of a character with different directions is the space character. In Unicode, there is only one encoding and it has no inherent direction. In MacArabic, on the other hand, there are distinct left-to-right and right-to-left space characters.

The code conversion system according to the invention converts source characters to target characters of a different encoding. The invention is a code conversion system that provides round trip fidelity, while ensuring that the resulting character codes are interchangeable with other platforms. The code conversion system is able to map a single source character or a sequence of characters to either a single target character or a sequence of target characters. With round trip fidelity, source text can be converted to target text and then back again to the original source text. The interchangeability of the resulting character codes with other platforms is ensured by maximizing the use of standard target characters, and by minimizing the use of private characters. The code conversion system is particularly useful for converting to/from Unicode characters from/to other character sets. Individual Unicode characters can have an inherent direction or can take their direction from surrounding context. The mapping of a sequence of Unicode characters to a single character in a target character set has heretofore been unavailable.

The code conversion system can be a computer system or other electronic device for performing these code conversion operations. This computer system may be specially constructed for the required purposes, or it may be a general purpose computer operating in accordance with a computer program. The processing presented herein is applicable to any computer system or other electronic device. In particular, various general purpose computing machines may be used with software written in accordance with the teachings herein, or it may be more convenient to construct a more specialized electronic device to perform the required operations.

The determining or resolving the direction of the source characters being converted is achieved with a resolve direction technique which is described in detail below with reference to a code conversion system that converts source characters to target characters of a different encoding.

FIG. 1 is block diagram of a representative computer system 100 in accordance with the present invention. The computer system 100 includes a central processing unit (CPU) 102. The CPU 102 is coupled bidirectionally with random access memory (RAM) 104 and unidirectionally with read only memory (ROM) 106. Typically RAM 104 includes programming instructions and data associated with code conversion, including tables as described herein, as well as other data and instructions for processes currently operating on CPU 102. The ROM 106 typically includes basic operating instructions, data and objects used by the computer system 100 to perform its functions. In addition, a mass storage device 108, such as a hard disk, CD ROM, magneto-optical (floptical) drive, tape drive or the like, is coupled bidirectionally with CPU 102. Mass storage device 108 generally includes additional programming instructions, data and text objects that typically are not in active use by the CPU 102, although the address space may be accessed by the CPU 102, e.g., for virtual memory or the like. Each of the above described computers further includes an input/ output source 110 that typically includes input media such as a keyboard, pointer device (e.g., a mouse or stylus) and the like. The computer system 100 can also include a network connection 112 over which data and instructions can be transferred to a network. Additional mass storage devices (not shown) may also be connected to CPU 102 through network connection 112. The computer system 100 further includes a display screen 114 for viewing text and images generated or displayed by the computer system 100.

The CPU 102 together with an operating system (not shown) operate to execute computer code. The computer code may reside on the RAM 104, the ROM 106, or a mass storage device 108. The computer code could also reside on a portable program medium 116 and then be loaded or installed onto the computer system 100 when needed. The portable program medium 116 may, for example, CD-ROM, PC Card device, RAM device, floppy disk, or magnetic tape.

I. Definitions

1. Code Point: A code point is a bit pattern in a particular encoding. Usually the bit pattern is one or more bytes long. A Unicode code point is always 16 bits or two bytes.

2. Encoding: An encoding is a one-to-one mapping between a set of characters and a set of code points. For example, the ASCII encoding maps a set including a–z, A–Z, and 0–9 to the code points x00 through x7F.

3. Text Element: A text element is a sequence of one or more code points that are treated as a unit for a particular operation. For example, LATIN CAPITAL LETTER U followed by NON-SPACING DIAERESIS is a text element (e.g., two adjacent characters in this example) the code conversion operation in accordance with the invention.

4. Glyphs: A displayed form that provides the visual representation of a character. For example, an italic "a" and a roman "a" are two different glyphs representing the same underlying character.

5. Presentation Form: A presentation form is a glyph that varies its visual form depending on the context. Some encodings map only abstract characters, which are independent of context, while other encodings map only presentation forms. For example, a ligature such as "fi" is a presentation form for the character sequence LATIN CAPITAL LETTER F followed by LATIN CAPITAL LETTER I.

6. Fallback: A fallback is a sequence of one or more code points in the target encoding that are not exactly equivalent to the source code points but which preserve some of the information of the original. For example, (C) is a possible fallback for ©.

7. Default: A default is a sequence of one or more code points in the target encoding that are used when nothing in the target encoding even resembles the source code points.

II. Unicode Converter

The conversion technique according to the invention converts source characters to target characters of a different encoding. Preferably, either the source characters or the target characters are Unicode characters.

Figure 2:
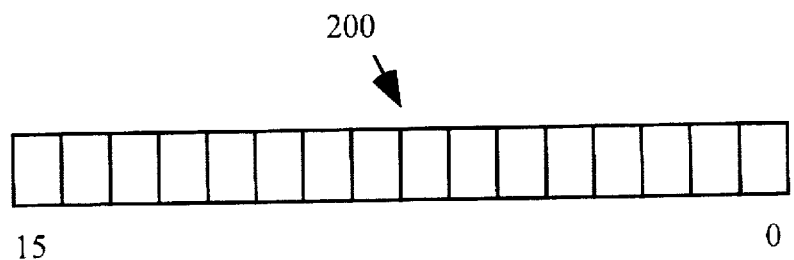
FIG. 2 illustrates the format of Unicode character encodings.

The Unicode standard is a compilation of character encodings developed into a single, universal, international character encoding standard. FIG. 2 illustrates the format of the Unicode character encodings. Specifically, the Unicode standard provides for codes which are 16 bits wide as illustrated by a format 200 shown in FIG. 2. Within this document, Unicode characters are represented in hexadecimal with a preceding u (e.g., u0041), and characters in other encodings are represented in hexadecimal with a preceding x (e.g., x41 for a 1-byte character, x8140 for a 2-byte character).

Figure 3:
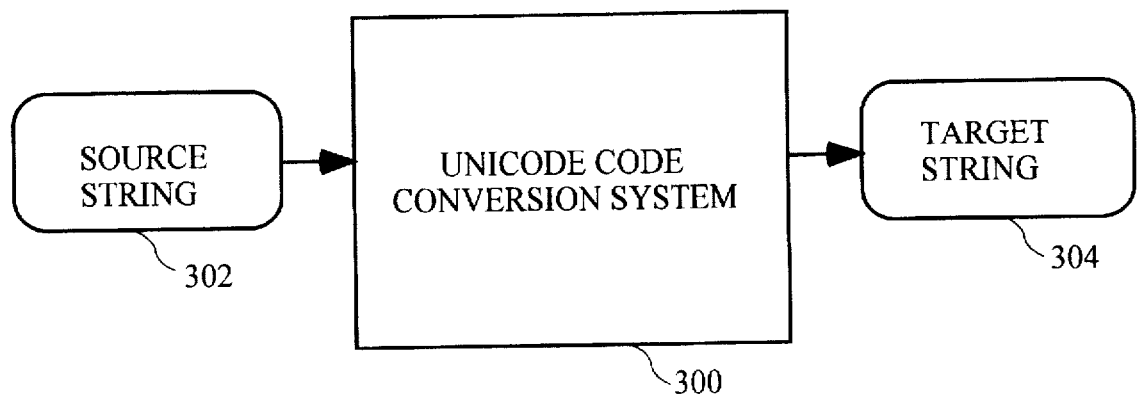
FIG. 3 illustrates a block diagram of a basic Unicode code conversion system according to the invention which receives a source string and outputs a target string.

FIG. 3 illustrates a block diagram of a basic Unicode code conversion system 300 according to the invention which receives a source string 302 and outputs a target string 304. The Unicode code conversion system 300 operates to convert characters of the source string 302 into one or more characters in the target stream which are of a different character encoding than the encoding utilized in the source string. Preferably, the Unicode code conversion system 300 converts from Unicode to a different target encoding (From-Unicode) or converts from a different source encoding (To-Unicode).

Figure 4:
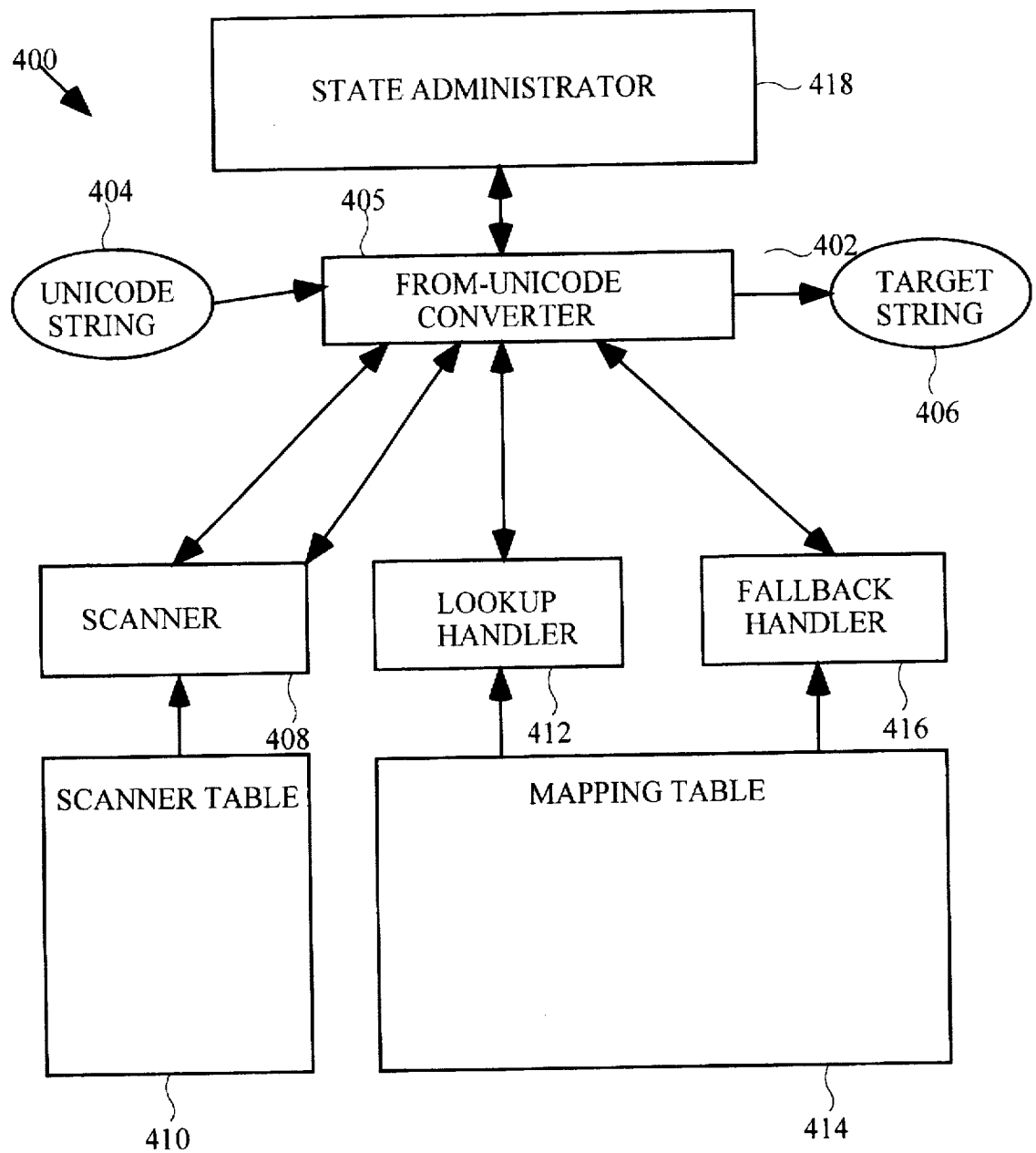
FIG. 4 illustrates a block diagram of an embodiment of a From-Unicode code conversion system according to an embodiment of the invention.

FIG. 4 illustrates a block diagram of an embodiment of a Unicode code conversion system 400 according to the invention. A Unicode code conversion system 400 includes a From-Unicode converter 402 which receives a Unicode string 404 and produces a target string 406. The From-Unicode converter 402 performs the code conversion process in accordance with the invention. In so doing, the From-Unicode converter 402 interacts with a scanner 408. The scanner 408 in conjunction with a scanner table 410 scans the Unicode string 20 404 to identify a text element. The From-Unicode converter 402 then uses a lookup handler 412 to look up the one or more characters in target encoding for the text element identified by the scanner 408. The lookup handler 412 uses a mapping table 414 to obtain the one or more characters in the target encoding for the text element. Additionally, the From-Unicode converter 402 may also use a fallback handler 416. The fallback handler 416 operates together with the mapping table 414 to identify one or more characters in the target encoding that are able to be used as a fallback mapping for the text element in cases where the look-up handler 412 has been unable to identify one or more characters in the target encoding for the text element. A state administrator 418 maintains or stores information on the current state of the conversion. This information may, for example, include context, direction and state of symmetric swapping.

A. Scanner and Scanner Table

The scanner 408 in conjunction with the scanner table 410 scans the 35 Unicode string 404 string and returns the next text element and any additional information needed by the look-up handler 412. The additional information includes one or more of direction information, context information, and various state indicators. The general operation of the scanner 408 is as follows. The scanner 408 scans through the characters of the input Unicode string 404. If direction information is needed for the target encoding, then the character direction is obtained for each character in the text element. Also, if character form context information is needed for the target encoding, then character form context information is obtained for each character in the text element. Then, as the scanner 408 scans through each of the characters, the scanner 408 takes an action for the character in accordance with information residing in the scanner table 410. The particular action that the scanner 408 takes is determined based on state and character class. The actions that the scanner 408 can take include: marking the current character, setting or clearing the symmetric swapping bit, noting the contextual form of a text element, setting a flag that indicates that the text element will need reordering, and indicating end of the text element. The symmetric swapping bit, the context and the direction are saved by the state administrator 418 as information pertaining to the state of the scanner. Before returning, the scanner 408 saves context information for the text element. The scanner 408 returns the text element (each text element within the input string) and its attributes. The attributes include the following: direction, class, priority, symmetric swapping state, subset and context. After the scanner 408 determines a text element, then the characters may need to be reordered into canonical order. As an example, reordering of the characters within a text element is done when the text element includes non-spacing marks that are not in canonical order as defined by Unicode.

Preferably, the scanner 408 together with the scanner table 410 are implemented as a pair of state machines that operate in parallel. A first state machine resolves the character direction, and a second state machine computes text elements and character form context information where applicable and also maintains the symmetric swapping state. By using two separate state machines, the Unicode code conversion system 400 is easier to design and maintain. The first and second state machines can be implemented as two-dimensional arrays (or tables) indexed by state and class. In cases where the action the scanner 408 is to take depends on the character direction, then the state machine entry is an index into another table which contains the appropriate action for the scanner 408 to take for each direction.

The function of the scanner 408 is to convert the input Unicode string 404 into text elements and to return the text elements and their attributes. The scanner 408 needs to save certain characteristics of the text element so that it can be properly converted in the target encoding. Namely, the characteristics include the direction, the context and the symmetric swapping state. However, the scanner 408 need not know what the target encoding is because its operation is independent of the particular target encoding. Nevertheless, the Unicode code conversion system 400 is preferably implemented such that the definition of a text element (i.e., the chunking behavior) could vary with the target encoding simply by modifying the scanner table 410.

The directionality of characters is used for presentation of the characters. For example, when Arabic or Hebrew are displayed on a display screen, they are ordered from right-to-left. Most Unicode characters have an implicit direction, see Unicode Version 1.0, at p. 407 (Section 4.6) and p. 611 (Appendix A). The implicit direction classes provided with the Unicode standard and their values include: Left-Right (0), Right-Left (1), European Number (2), European Number Separator (3), European Number Terminator (4), Arabic Number (5), Common Number Separator (6), Block Separator (7), Segment Separator (8), Whitespace (9), and Other Neutrals (10). The scanner 408 looks up the direction class for characters of the text element. The direction class is then used to resolve the direction of the text element. There are also special Unicode characters which cause overriding or embedding of directionality. These special direction Unicode characters are treated by the scanner 408 as single character text elements.

There are some basic rules that the scanner 408 follows in forming the text elements. The base rule is that if none of the rules apply, then the text element is a single Unicode character. Another rule is that non-spacing or combining marks following a base character are grouped with the base character as a single text element. Yet another rule is that characters associated with symbols (e.g., Korean Hangul Jamos characters), ligatures or ideographs are encountered, they are combined into text elements. Still another rule is that when a fraction slash is surrounded on each side by a sequence of one or more decimal digits, they are combined as a numeric fraction text element.

The rule for non-spacing or combining marks is now explained in greater detail. According to the Unicode standard, non-spacing marks follow the base character. Hence, the non-spacing marks that follow a base character become part of the text element that includes the base character. See, The Unicode Standard, Version 1.0, at p. 403 (Section 4.5). For example, when a single, non-spacing character is followed by a character that is not a non-spacing character, then the non-spacing character is combined with the previous character as a text element. The length of the text element is then two and the attributes for the text element are defined by the base character. If there is no preceding character, the non-spacing character is just passed on as a single text element. Multiple non-spacing characters can also be combined in this manner.

The rule for Korean Hangul Jamos characters is now explained in greater detail. Each Hangul character has an implicit value which is of one of the classes: Choseong (initial), Jungseong (medial) or Jongseong (final). The Unicode Standard, Version 1.1, (Section 5), lists the codes and the permitted combinations for these characters. The scanner 408 will group the Korean Jamos characters according to the permitted combinations of these characters. For input combinations which are not permitted, the scanner 408 will return the character as a single text element. As before, when a Hangul syllable is followed by a combining mark, the combining mark is included within the text element for the Hangul syllable.

The rule for numeric fractions is now explained in greater detail. The scanner 408 initially treats each character of fraction slash numbers as if they were single character text elements. However, when a complete fraction slash sequence is encountered, the scanner 408 will join the characters associated with the sequence into a single text element. If a digit is encountered with a combining mark, the digit and the combining mark cannot be part of a fraction slash, but the digit and the combining mark can together form a text element.

Except for non-spacing characters, all Arabic characters are passed through the scanner 408 as single text elements. The Arabic form shaping state characters are also passed through the scanner as single text elements. The directional formatting codes are passed through the scanner 408 as single text elements.

B. Lookup Handler, Mapping Tables and Fallback Handler

The mapping table 414 is used by the lookup handler 412 to match an input sequence of one or more Unicode characters to an output sequence of one or more characters in the target encoding. In addition to the Unicode sequence (i.e., text element) itself, certain additional pieces of information about the input sequence are available (e.g., direction, context, symmetric swapping state, vertical forms request, fallback request, tolerance, variant), and some tables make use of this information. Preferably, the mapping table 414 also stores data needed by the fallback handler 416, though a separate table could be provided for use by the fallback handler 416.

Figure 5:
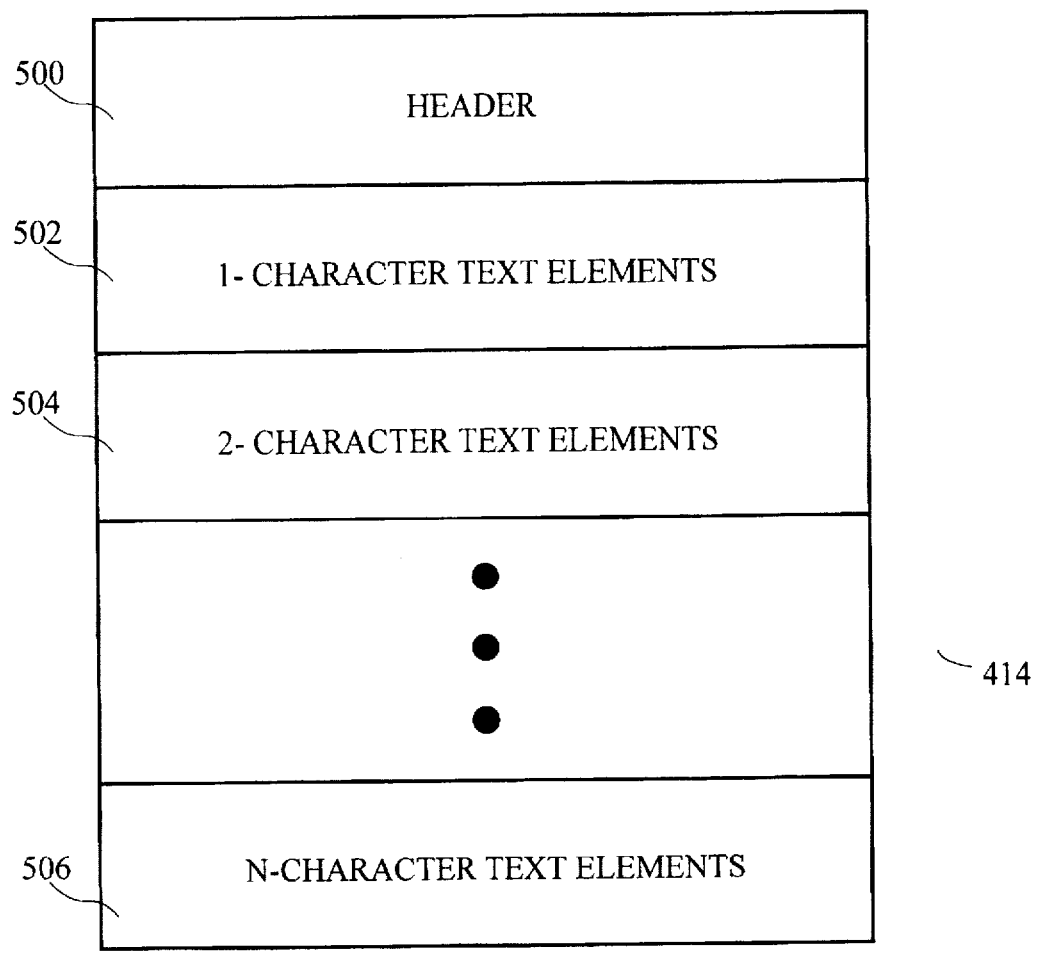
FIG. 5 is a schematic diagram of a preferred arrangement for a mapping table of the Unicode code conversion system.

FIG. 5 is a schematic diagram of a preferred arrangement for the mapping table 414 of the Unicode code conversion system 400. The mapping table 414 preferably includes a header portion 500 and then segments of data within the mapping table 414 partitioned based on the number of characters in the text element. The contents of the header portion 500 is discussed in detail below. The mapping table 414 illustrated in FIG. 5 supports encodings for text elements of one to N characters. When the look-up handler 412 searches the mapping table 414 for target encodings for one-character text elements, the segment 502 of the mapping table 414 would be utilized. Similarly, if the text element is two-characters wide, then segment 504 would be used, and if the text element was N characters wide, then segment 506 would be used. Although FIGS. 4 and 5 illustrate a single mapping table 414, the Unicode code conversion system 400 uses a plurality of different mapping tables 414, namely one mapping table for each target character set. Each mapping table includes multiple subtables.

The mapping tables 414 are designed with size and overall conversion speed requirements kept in mind. The mapping tables 414 should be as small as possible without severely degrading lookup time, and the lookup time should be as fast as possible without significantly increasing the table size. The Unicode code conversion system 400 supports multiple table formats so that different formats are possible for each subtable, thereby enabling the speed/size tradeoff to be adjusted for a particular table as needed. Preferably, the design of the mapping table 414 should make the mapping from a single Unicode character to a single character in the target encoding as fast as possible since it is the most common case.

The mapping table 414 design is such that the tables support at least some of the needs of the fallback handler 416, support multiple mapping tolerances, and support multiple target character set variants. The table format is also capable of mapping Unicode sequences of one or more characters to an output sequence of zero or more characters. The mapping tables 414 can also specify several possible output sequences for a single input sequence, with the particular output sequence determined by attributes such as direction, context and symmetric swapping state. The mapping tables are also easily extended, so as to facilitate customization of the encoding behavior of the Unicode code conversion system 400.

The information needed by the mapping tables 414 includes the following: the text element from the scanner 408 (i.e., input sequence of characters to convert, with any combining marks in canonical order); whether vertical forms should be used instead of horizontal forms where available; the resolved direction of the text element; the context information for the text element (initial, medial, final, or isolated); current state of symmetric swapping (activated or inhibited); information about what level of lookup to be invoked (i.e., tolerance level (strict or loose) and fallbacks (on or off)); and an identifier for a particular encoding variant (a variant identifier). The information about the lookup level is provided by a call or an application program which calls the Unicode code conversion system 400. In a language or character set in which direction and context are unimportant, the resolved direction and the context information are not needed.

The definition of variants, the actual mappings from Unicode sequences to target sequences, and the table formats used to access them are alterable by the design of the mapping table 414. Hence, the accuracy and to some extent the performance/size tradeoffs are highly dependent the design of the mapping tables 414. It is preferable that the mapping tables 414 support strict and loose mappings, fallback mappings, and default mappings.

Strict mappings are code conversions in which round trip fidelity is guaranteed. Strict mappings from Unicode to a target character set are the converse of the mappings from that character set to Unicode. Hence, round-trip mapping from Unicode to some other character set and back again is possible when using only Unicode characters for which strict mappings to the other character set exist. Loose mappings from Unicode to the target character set are additional mappings that fall within the range of definition or established usage for the characters in the target character set. Loose mappings appear properly mapped but have some ambiguity. For example, in many character sets, a single character may have multiple semantics, either by explicit definition, ambiguous definition, or established usage. For example, the Shift-JIS character x8161 is specified to have two meanings: "double vertical line" and "parallel". Each of these meanings corresponds to a different Unicode character: u2016 "DOUBLE VERTICAL LINE" and u2225 "PARALLEL TO". When mapping from Shift-JIS to Unicode, the code conversion system must choose one of these Unicode characters, say DOUBLE VERTICAL LINE. When mapping from Unicode to Shift-JIS, the code conversion system can—and normally should—map both Unicode characters to the same Shift-JIS character. However, only one of these From-Unicode mappings is the converse of the To-Unicode mapping.

Strict verses Loose Mapping Examples:
- If Unicode u000D is strictly mapped to ASCII x0D "carriage return", then Unicode u2029 "PARAGRAPH SEPARATOR" can be loosely mapped to ASCII x0D.
- If Unicode u002D "HYPHEN-MINUS" is strictly mapped to ASCII x2D "hyphen-minus", then Unicodes u2010 "HYPHEN" and u2212 "MINUS SIGN" can be loosely mapped to ASCII x2D.
- If Unicode u00E0 "LATIN SMALL LETTER A WITH GRAVE" is strictly mapped to ISO 8859-1 xE0 "small letter a with grave accent", then the two-character Unicode sequence u0061+u0300 "LATIN SMALL LETTER A"+"COMBINING GRAVE ACCENT" can be loosely mapped to ISO 8859-1 xE0.
- Since Shift-JIS distinguishes halfwidth and fullwidth characters, loose mappings for Shift-JIS must also keep these distinct. Say Unicode uFF40 "FULLWIDTH GRAVE ACCENT" is strictly mapped to Shift-JIS x814D "grave accent [fullwidth]", which is distinct from Shift-JIS x60, "grave accent [halfwidth]". The Unicode sequence u3000+u0300 "IDEOGRAPHIC SPACE"+"COMBINING GRAVE ACCENT" can be loosely mapped to Shift-JIS x814D. However, the Unicode sequence u0020+u0300 "SPACE"+"COMBINING GRAVE ACCENT" should not be loosely mapped to Shift-JIS x814D; instead, it should be loosely mapped to Shift-JIS x60.

Fallback mappings are mappings from Unicode that do not preserve the meaning or identity of the Unicode character. That is, they map a Unicode character (or sequence of characters) to a character (or sequence) in the target set whose definition or usage does not include the meaning or usage of the Unicode character. Nevertheless, the fallback mapping, when available, provides a character (or sequence) in the target encoding that corresponds closest to the Unicode character (or sequence of characters).

Fallback Mapping Examples:
- The Unicode character u0300 "COMBINING GRAVE ACCENT" can be mapped to ASCII x60 "grave accent [spacing]" as a fallback mapping. The difference is that the Unicode character is a combining mark (non-spacing), whereas the ASCII character is a spacing mark.
- The Unicode character u01C0 "LATIN LETTER DENTAL CLICK" could be mapped to ASCII x7C "vertical line" as a fallback mapping.
- The Unicode character u2001 "EM QUAD" could be mapped to ASCII x20 "space" as a fallback mapping.

Hence, as illustrated in the above examples, fallback mappings are used to generate a target character (or sequence) that is a graphic approximation of the Unicode character (or sequence).

For performance reasons (i.e., the speed with which the encoding can be obtained from the mapping table), there are several possible formats for indexing into the mapping table 414. The possible formats may include a segment format, a list format, a range format, or a chain format. Separate indexes are preferably provided for different length character sequences. As a result, the index associated with each of the segments 502, 504, 506 of the mapping table 414 can be in a different format, and information at the beginning of each index specifies its format. Regardless of format, each index ultimately maps an input sequence either directly to an output sequence, or if the output sequence is long, to an offset that specifies the location of the corresponding output sequence.

The chain format for indexing into the mapping table 414 warrants further discussion. With the chain format, the beginning of the section is checked to determine whether it is a chain header for a chain format table or some other format. The chain format specifies a chain of multiple index tables, each possibly in a different format. If the desired mapping was not found in the first index table, the lookup handler 412 will then check the second, and so on. The chain format is useful, for example, when one index format (which is efficient in space and/or time) can map most but not all of the input sequences, while another less efficient index format can handle the few remaining sequences. Without a chain mechanism, the less-efficient format would have to be used for all of the index sequences. The chain format is also useful when different variants and different tolerance levels require different subtables. Each subtable in the chain has bit flags that can cause it to be excluded or included based on the mapping tolerance and variant currently being handled. When the lookup handler 412 searches the mapping table 414 for target encodings only the included subtables are considered.

These bit flags associated with each subtable form a subtable mask. Also, the caller requests (e.g., encoding variant and tolerance) and determined attributes (e.g., resolved direction and context) form a selection mask. The bit assignment within the subtable mask and the selection mask are identical. Hence, the determination of whether or not to include a particular subtable is implemented as a bitwise AND of the subtable mask with the selection mask, and then a comparison of the result with the subtable mask. If the result of the bitwise AND is the same as the subtable mask for the subtable, the subtable is included; otherwise, it is not included.

The header 500 of the mapping table 414 preferably contains:

General identifying information—format, length, checksum, and version.

The minimum target character size (in bytes) (also referred to as charsize).

General flags (for example, whether this lookup table requires direction or context data).

The maximum input sequence length handled by this table, and a list of offset/length pairs specifying the tables that handle input sequence lengths from one through this maximum.

The default fallback character or character sequence for this From-Unicode mapping.

A count and list of variants supported by this table. For each variant, one or more associated bit masks are specified. When there are multiple bit masks for a single variant, attribute information (such as direction, context, and vertical forms request) is used to determine which bit mask is used. Bits set to "1" in a bit mask are used to turn on various subtables to support the different variants.

An additional set of bit masks associated with each of the four possible tolerance settings (strict/loose, fallbacks on/off). The appropriate tolerance level mask is ORed with the variant mask to form the bit mask used to enable or disable subtables.

C. Code Conversion Processing

The processing performed by a preferred embodiment of the Unicode code conversion system 400 is explained in detail below.

Figure 6:
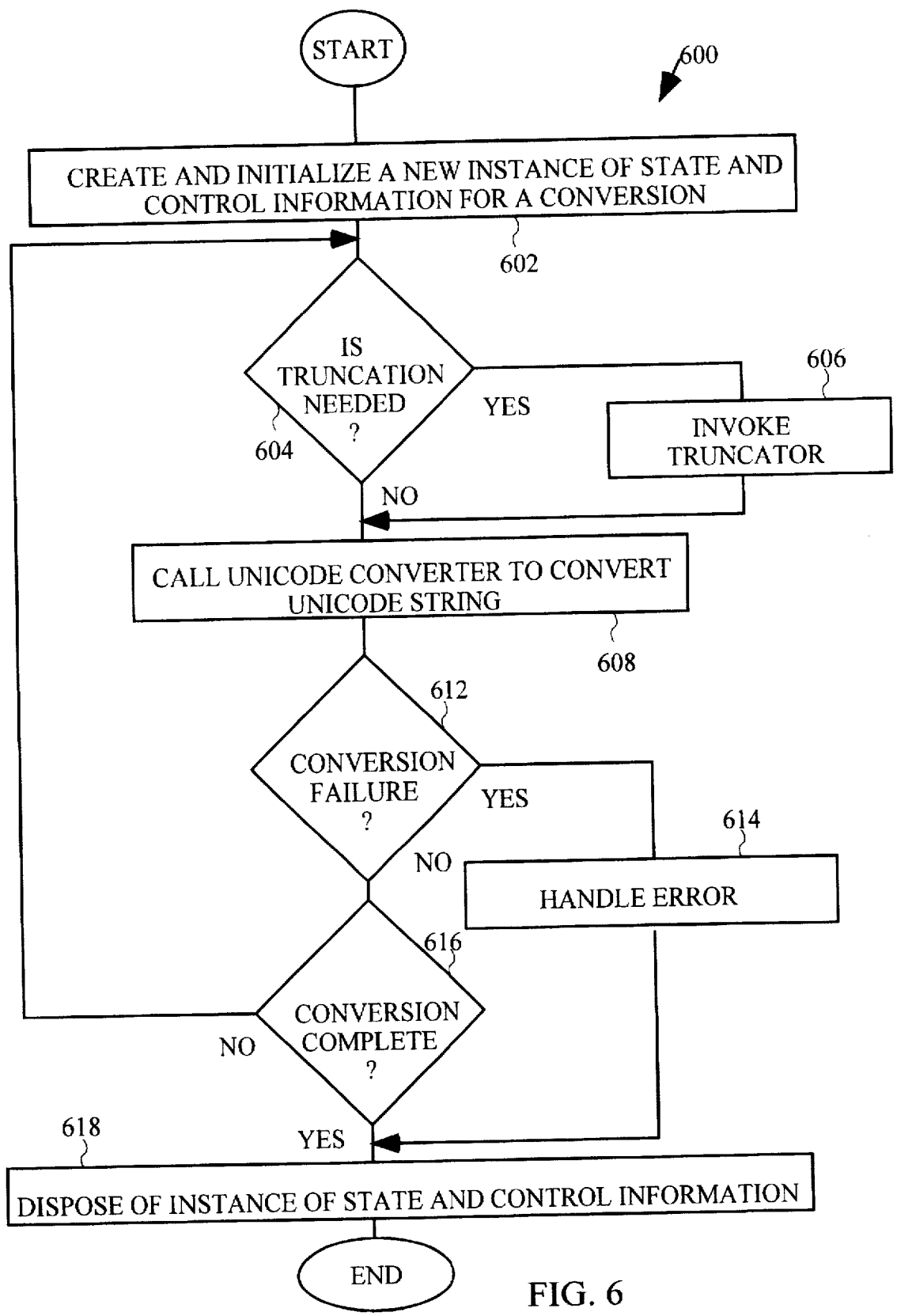
FIG. 6 is a flow chart of processing performed by an application program making use of the Unicode code conversion system according to an embodiment of the invention.

FIG. 6 is a flow chart of processing 600 performed an application (i.e., calling application process or program) making use of the Unicode code conversion system 400. In particular, FIG. 6 concerns From-Unicode processing, but it should be recognized that analogous operations would be performed to convert in the other direction (To-Unicode processing). The From-Unicode Converter 402 controls the overall conversion process.

Initially, the processing 600 creates and initializes 602 a new instance of state and control information for a conversion. Because the processing 600 establishes instances, multiple scanning operations can be ongoing and distinguishable by their instance. Next, a decision 604 is made based on whether truncation is needed. In the case where truncation is needed, a Unicode truncator is called 606. Truncation is used when the input data stream exceeds the capacity of the reserve buffer which holds the data for conversion. Additional details on conversion are contained in commonly-assigned and concurrently filed U.S. Pat. No. 5,682,158, entitled, "CODE CONVERTER WITH TRUNCATION PROCESSING", which is hereby incorporated by reference. In a case where truncation is not needed or following block 608 in the case where truncation is needed, The From-Unicode converter 402 is called 608 to convert the Unicode string 404. The From-Unicode converter 402 function operates to obtain the text element and lookup the target mapping therefore as is discussed in detail below. Once the conversion function returns, the processing 600 receives the target string 406 from the From-Unicode converter 402.

The processing 600 then determines 612 whether there has been a conversion failure. If there has been a conversion failure, then the error is handled 614. On the other hand, if the conversion was successful, then a decision 616 is made based on whether the conversion is complete. The conversion is complete when the characters of the Unicode string 404 have been converted to target encodings. If the conversion is complete, then the processing 600 is complete and the target string 406 is made available to process or application which requested the code conversion. In addition, the processing 600 disposes 618 of the instance of state and control information for a conversion. On the other hand, if decision 616 determines that the conversion is not yet complete, then the processing 600 repeats blocks 604–616 until the conversion is complete or an error results.

Figure 7:
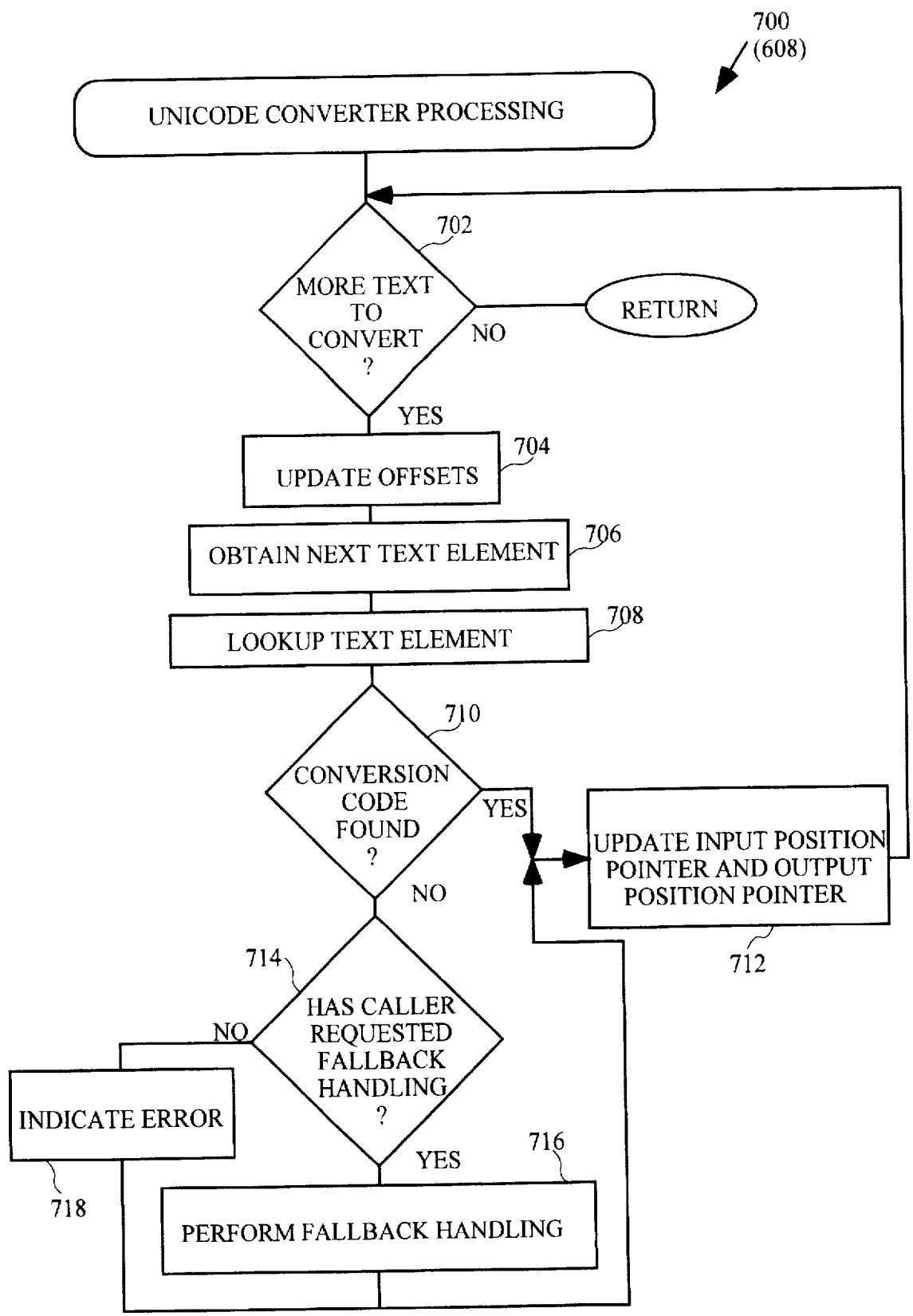
FIG. 7 is a flow chart of Unicode converter processing according to an embodiment of the invention.

FIG. 7 is a flow chart of Unicode converter processing 700. The Unicode converter processing 700 is associated with the operations performed by block 608 in FIG. 6.

The Unicode converter processing 700 begins with a decision 702. The decision 702 determines whether there is text to be converted. If there is no text to be converted, the Unicode converter processing 700 simply returns (or completes). On the other hand, if there is text to be converted (i.e., the Unicode string 404 has not been completely processed), then processing 700 proceeds. First, offsets are updated 704 for an offset array. The offset array is an array of offsets (pointers) associated with an input string that indicate where certain changes such as font changes, line breaks, language changes, etc., occur within the input string 404 that the calling application deems significant. The updating 704 of the offset array involves adjusting the offsets (pointers) for different length characters. For example, the Unicode characters of the input Unicode string 404 are two-bytes long, while the size of the characters associated with a target encoding of ASCII is one-byte long. Here, the updating 704 of the offset array would adjust the offsets so that they point to the corresponding character in the target encoding. In effect, the offsets in the input string are mapped to the output string which has a different encoding. The next text element is then obtained 706. The scanner 408 using the scanner table 410 determines the text elements from the Unicode string 404. The obtaining 706 of the next text element is discussed in detail below. The text element obtained 706 is then looked-up 708 in the mapping table 414 to obtain a conversion code for the text element in the target encoding. The lookup is performed by the lookup handler 412 in conjunction with the mapping table 414. The looking-up 708 of the conversion code is also discussed in detail below.

Next, a decision 710 is made based on whether a conversion code was found for the text element. When a conversion code is found, an input position pointer and an output position pointer for the Unicode string 404 and the target string 406 are, respectfully, updated 712. The input position pointer indicates how much of the input string 404 has been converted. The output position pointer indicates the length of the target string 406. Following block 712, processing 700 returns to the beginning of the Unicode converter processing 700 so that the next text element (if any) of the Unicode string 404 being converted may be processed.

However, in the case when decision 710 determines that no conversion code is found in the mapping table 414, then a decision 714 is made based on whether the caller has requested fallback handling. If the caller has requested fallback handling, then fallback handling is performed 716. The fallback handling is performed by the fallback handler 416 and is discussed in detail below. On the other hand, if the caller has not requested fallback handling, then an error is indicated 718 because the text element could not be converted to the target encoding by the lookup handler 412. Following blocks 716 and 718, the input position pointer and the output position pointer for the Unicode string 404 and the target string 406 are, respectively, updated 702, and then processing returns to the beginning of the Unicode converter processing 700 so that the next text element (if any) of the Unicode string 404 being converted may be processed.

Figure 8:
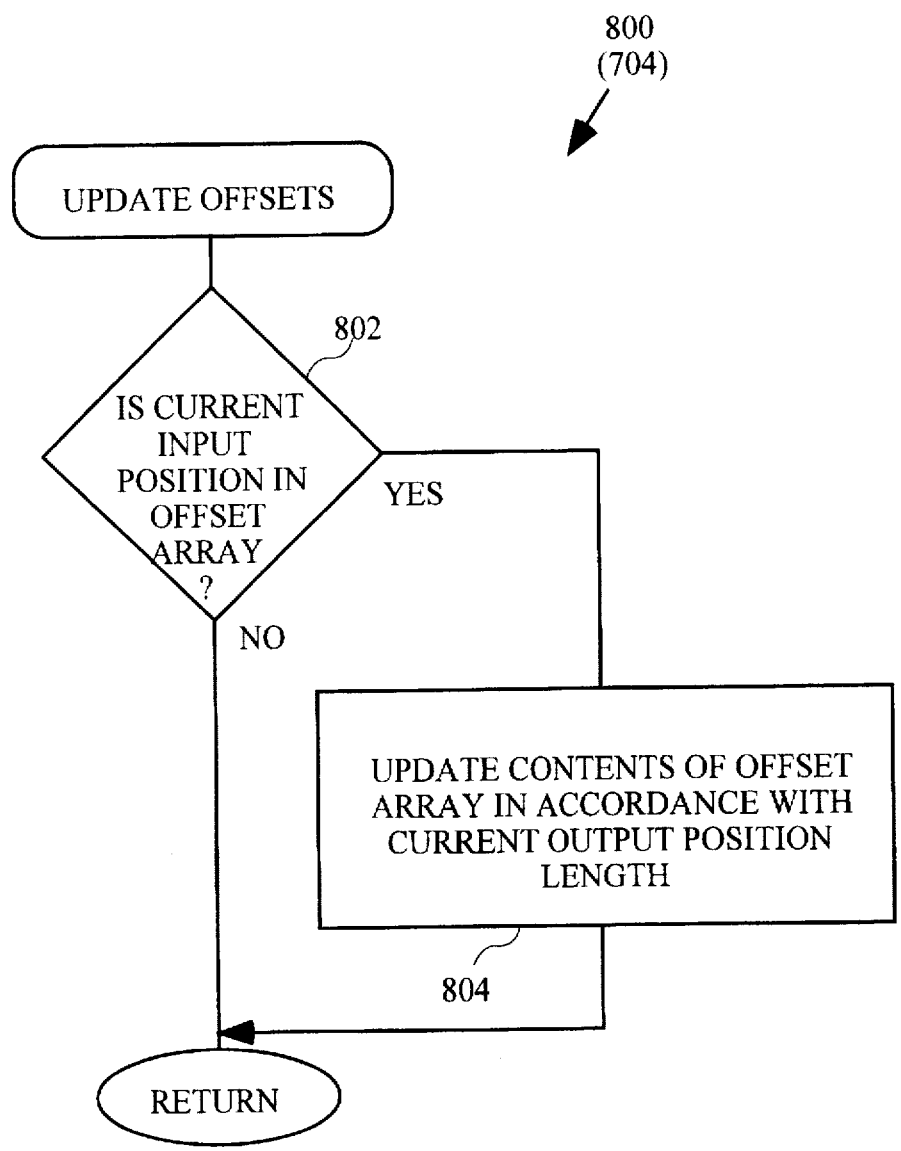
FIG. 8 is a flow chart of update offsets processing according to an embodiment of the invention.

FIG. 8 is a flow chart of update offsets processing 800. The update offsets processing 800 is associated with the block 704 in FIG. 7 in which the offset array is updated.

The update offsets processing 800 begins with a decision 802 based on whether the current input position is in the offset array. If the current input position is in the offset array, then the contents of the offset array are updated 804 in accordance with the current output position length following block 804, the update offsets processing 800 returns. On the other hand, when the current input position is not within the offset array, then decision 802 simply causes the update offsets processing 800 to return because there is no offset to update.

Figure 9A:
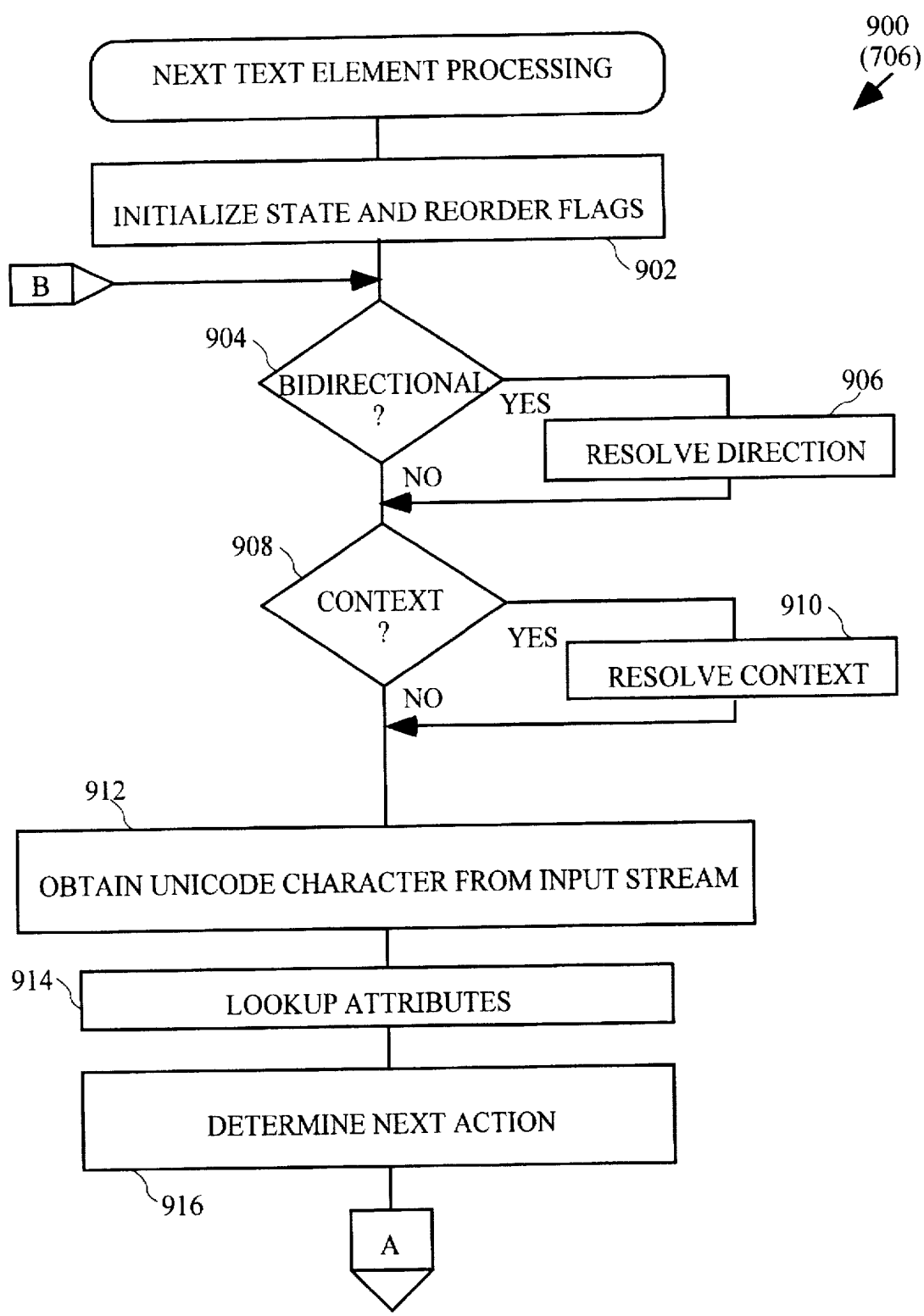
FIGS. 9A and 9B are flow charts of next text element processing according to an embodiment of the invention.
Figure 9B:
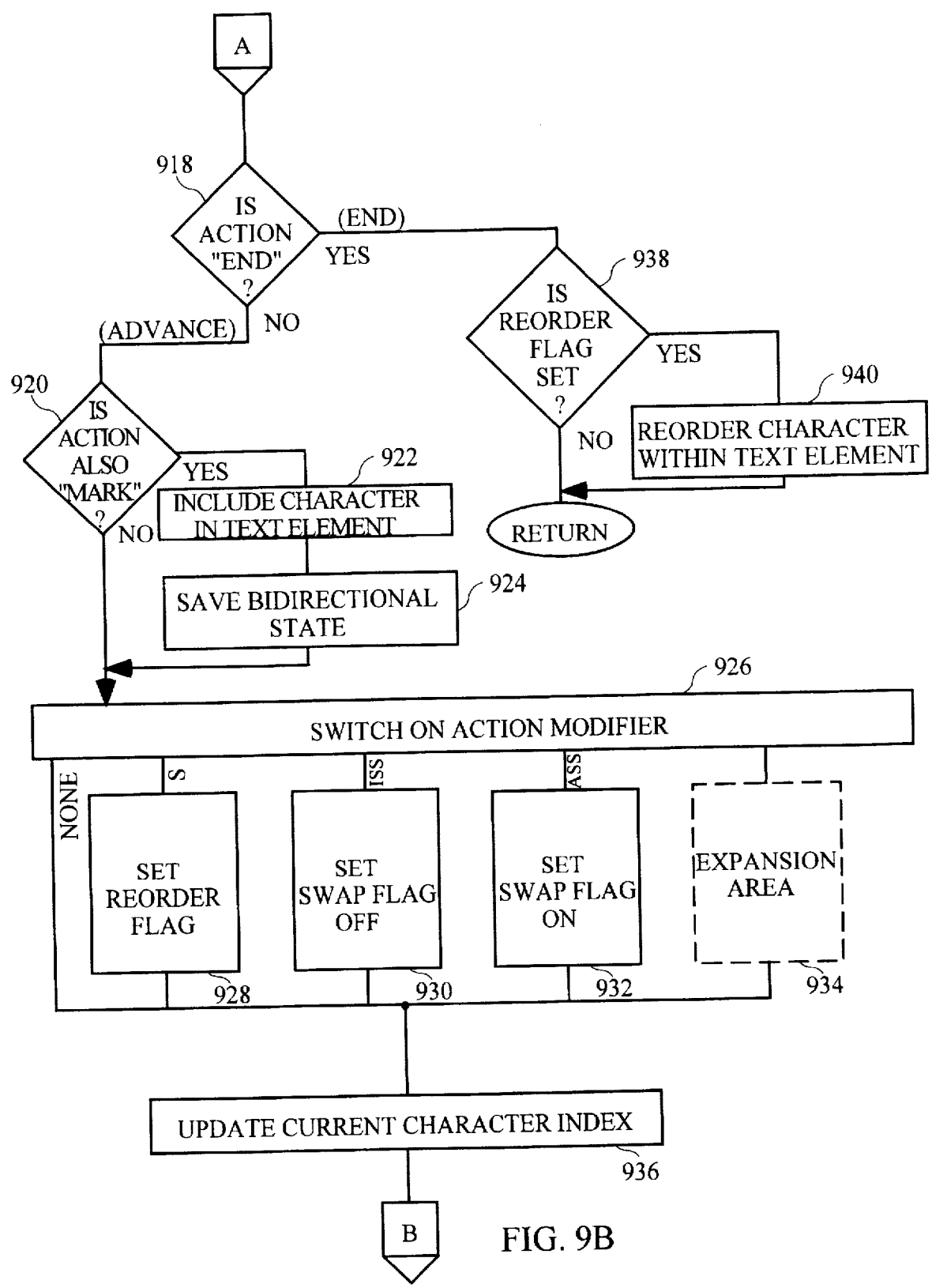

FIGS. 9A and 9B are flow charts of next text element processing 900. The next text element processing 900 details the operations performed by the block 706 in FIG. 7 in obtaining the next text element. Preferably, the next text element processing 900 is performed by the scanner 408 in conjunction with the scanner table 410.

The next text element processing 900 begins by initializing 902 state and reorder flags. Next, a decision 904 is made based on whether the mapping table 414 needs direction information. If the mapping table 414 requires direction information, then the direction of the next input character of the Unicode string 404 is resolved 906. After the direction is resolved 906 or after the decision 904 in the case where the direction is not required, a decision 908 is made based on the context of the character. If the context of the characters within the Unicode string 404 can effect the code conversion (mapping), the context is resolved 910. The processing associated with resolving 910 the context is discussed in detail in commonly-assigned and concurrently filed U.S. patent application Ser. No. 08/527,837, entitled, "CONTEXT-BASED CODE CONVERTER", which is hereby incorporated by reference. Following block 910 or following decision 908 when context is not important, the Unicode character is obtained 912 from the Unicode string 404. Here, the next character in the Unicode string 404 is obtained. Next, the attributes for the Unicode character obtained are looked-up 914. The attributes looked-up 914 are discussed in detail below with reference to FIGS. 10–12. Then, the action for the next text element processing 900 is determined 916. The determination 916 of the action is explained in greater detail below with reference to FIGS. 13A, 13B and 14.

Next, a decision 918 is made based on whether the action is "END". If the action is not "END", then the action is at least an "ADVANCE". When the action is "ADVANCE", a decision 920 is then made based on whether the action is also "MARK". When the action is also "MARK", then the character is included 922 in the text element. Additionally, the bidirectional state is saved 924 when a "MARK" action is taken. The bidirectional state includes the directional embedding stack and the current state of the bidirectional state machine. Following block 924 or following decision block 920 when the action is not also "MARK", a switch operation 926 is performed based on an action modifier. The action modifier is a part of the action and includes modifiers such as "S", "ISS", "ASS". The action may also not have any action modifier. When the action modifier is "S", then a reorder flag is set 928. The reorder flag indicates (when set) that the characters within the text element may need to be reordered. When the action modifier is "ISS", (i.e., Inhibit Symmetric Swapping) then a swap flag is set off 930. When the action modifier is "ASS" (i.e., Activate Symmetric Swapping), the swap flag is set on 932. The swap flag indicates whether or not symmetric swapping is needed. The switch 926 can easily be adapted to include additional action modifiers using an expansion area 934. The expansion area 934 enables users to modify the behavior of the scanner 408. Also, if there is no action modifier, then the next text element processing 900 does not perform any operation associated with action modifiers. Following the action modifier operations, a current character index is updated 936. The current character index is a pointer into the source string used to scan through the source string when performing the next text element processing 900. The next text element processing 900 then repeats operations beginning at block 904. The processing loops through blocks 904–936 until the decision 918 determines that the action is "END". When the action is "END", decision 918 causes a decision block 938 to be performed. The decision block 938 determines whether the reorder flag is set. If the reorder flag is set (see block 928), then characters within the text element are reordered 940. The reordering is preferably performed using the priority attribute which provides weighting values for different character classes. Following block 938 in the case where the reorder flag is not set or following block 940 in the case when the reorder flag is set, the next text element processing 900 is complete and returns to the Unicode converter processing 700.

Figure 10:
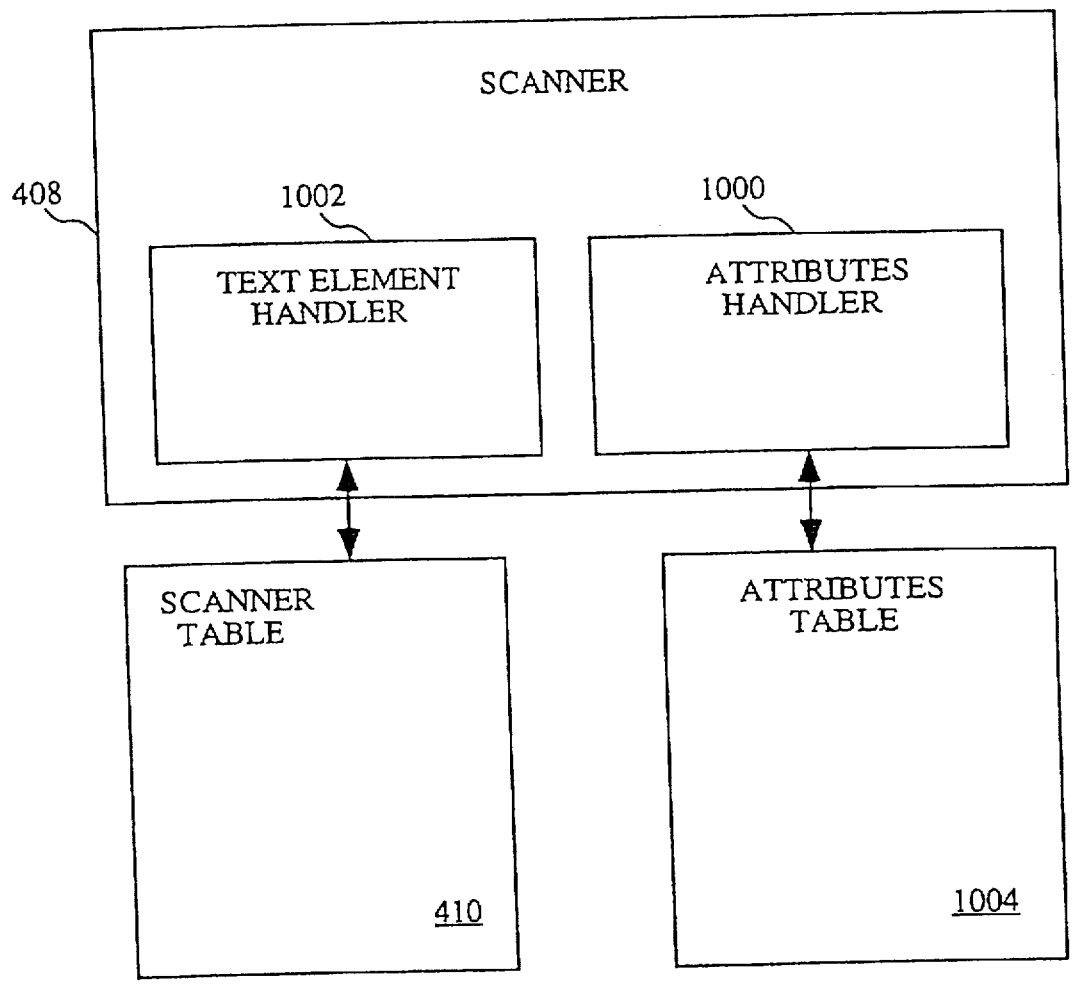
FIG. 10 is a block diagram of a scanner according to an embodiment of the invention.

FIG. 10 is a block diagram of the scanner 408. The scanner 408 among other things, includes an attributes handler 1000 and a text element handler 1002. The text element handler 1002 performs the next text element processing 900 described above with reference to FIGS. 9A and 9B. The attributes handler 1000 interacts with an attributes table 1004 to obtain the attributes for a Unicode character, as needed by the next text element processing 900 (see block 914 of FIG. 9A). The attributes include the following: direction, class, priority, symmetric swapping, subset and context. The direction attribute is used in resolving 906 direction. The class attribute is used by the scanner 408 to determine actions (e.g., ADVANCE, END). The priority attribute is used for reordering the characters within a text element (see block 940 FIG. 9B). The symmetric swapping attribute is used to whether or not symmetric swapping is needed. The context attribute is used in resolving 910 context.

Figure 11:
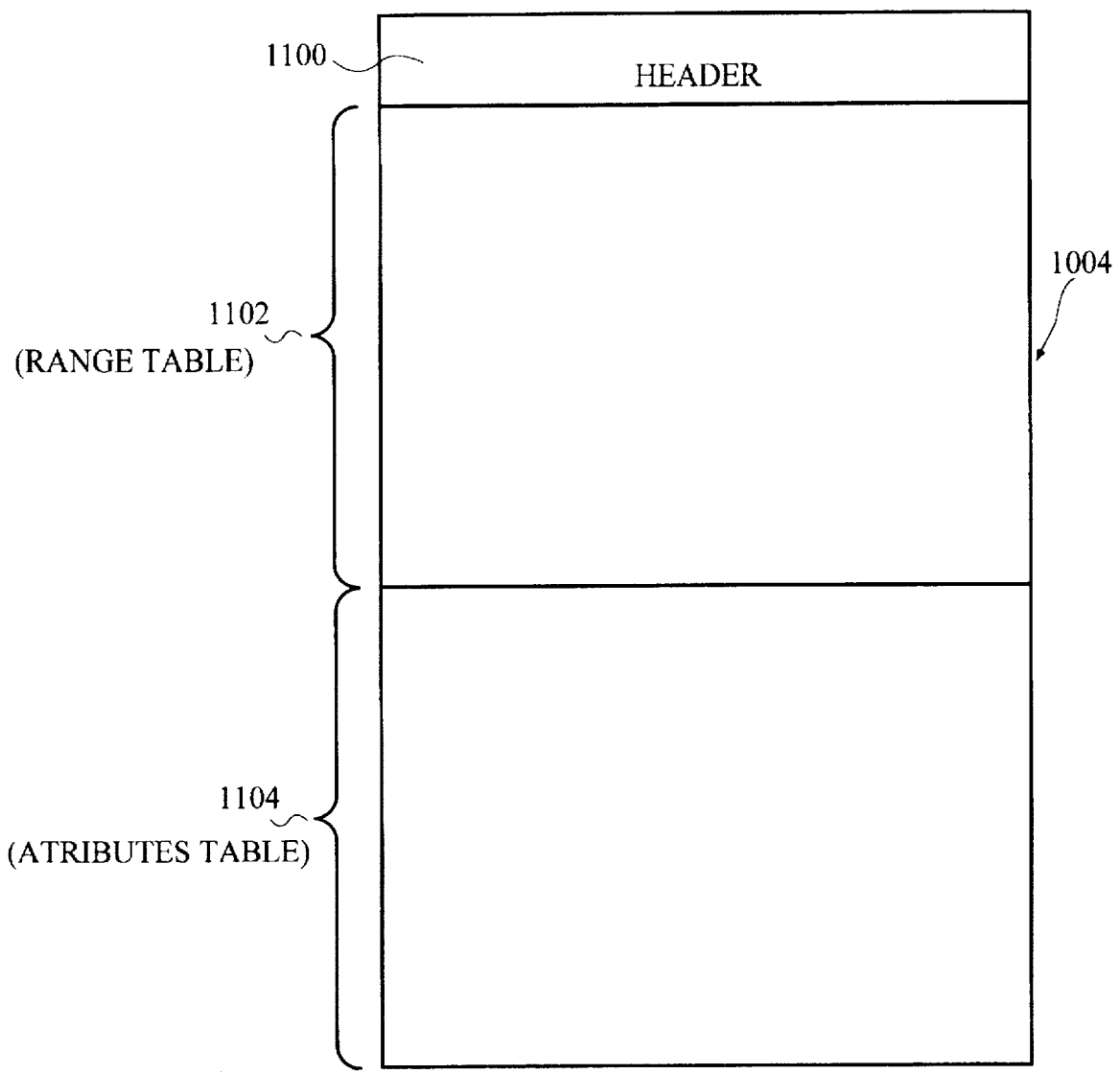
FIG. 11 is a schematic diagram of a preferred format for the attributes table shown in FIG. 10.

FIG. 11 is a schematic diagram of a preferred format for the attributes table 1004 of FIG. 10. The attributes table 1004 includes a header portion 1100, a range table portion 1102, and an attributes table portion 1104. The header portion 1100 includes information concerning the following: total table size, checksum value, version, offset and number of elements for each table. The elements within the range table portion 1102 provide ranges in which the attributes are commonly grouped, and then for each such group provides a pointer to the appropriate portion of the attributes table portion 1104. The format of the range table portion 1102 of the attributes table 1004 includes, for each entry, a beginning of range value, an ending of range value, and a data word associated with the range. The arrangement of the attributes table 1004 facilitates compact storage of the attribute information. Alternative storage arrangements are possible but may be less efficient in terms of compactness of data storage.

Figure 12:
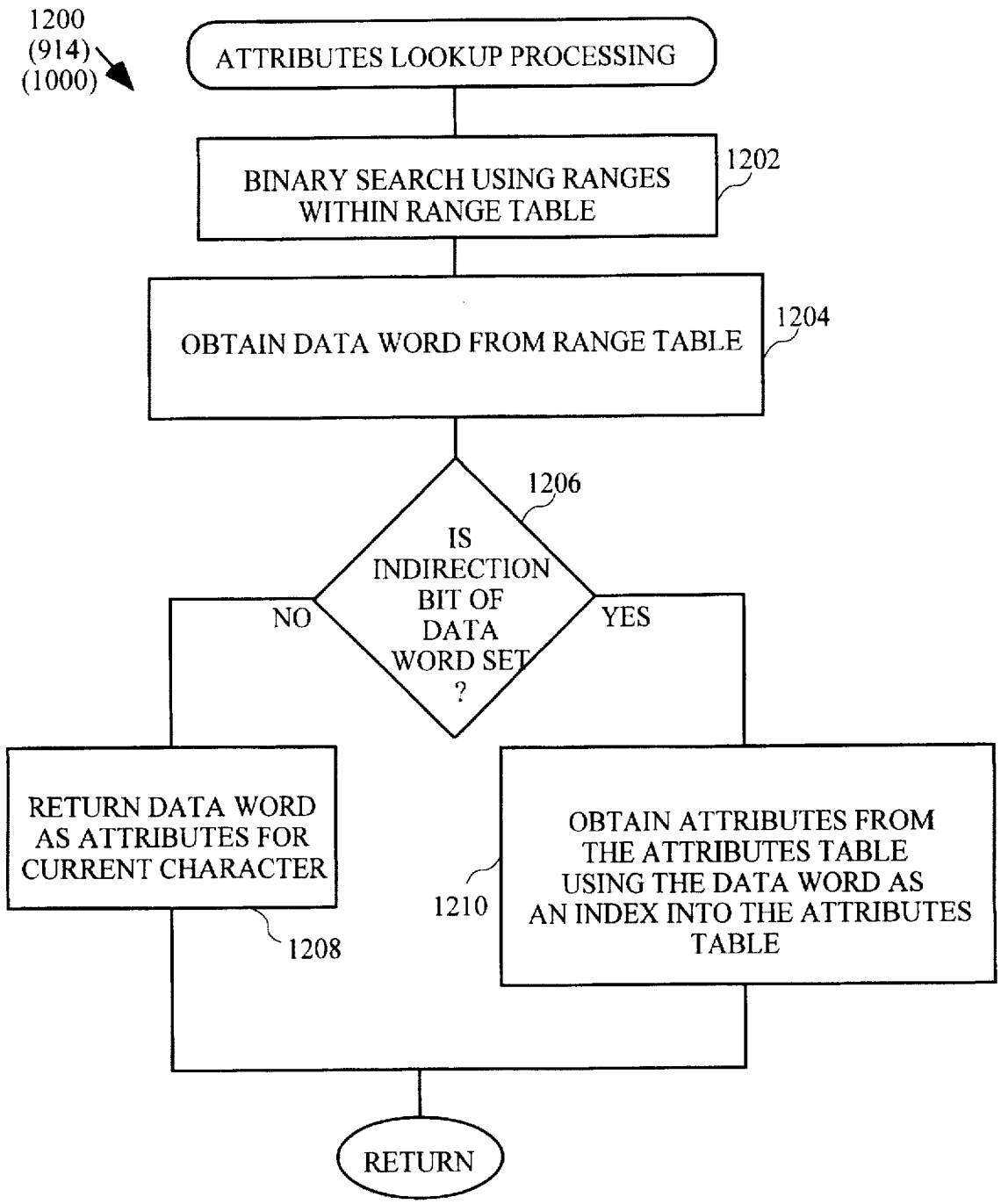
FIG. 12 is a flow chart of attributes lookup processing according to an embodiment of the invention.

FIG. 12 is a flow chart of attributes lookup processing 1200. The attributes look-up processing 1200 is performed by the attributes handler 1000, and initiated by the next text element processing 900 in block 914 of FIG. 9A.

The attributes lookup processing 1200 begins with a binary search 1202 using the ranges within the range table portion 1102 of the attributes table 1004. Once the appropriate range is identified by the binary search, the data word associated with that range is obtained 1204 from the range table portion 1102. Preferably, the first bit of the data word is an indirection bit. A decision 1206 is then made based on whether the indirection bit of the data word is set. In the case where the indirection bit of the data word is not set, the data word itself contains the attributes for the current character, therefore, the data word is returned 1208 as the attributes. On the other hand, when the indirection bit of the data word is set, then the attributes are obtained 1210 from the attributes table portion 1104 using the data word obtained from the range table portion 1102 as an index or offset into the attributes table portion 1104. Hence, the data word in this case is an index or offset to an array that contains the attributes for each character in the range. Following either blocks 1208 or 1210, the attribute lookup processing 1200 is complete and returns.

Figure 13A:
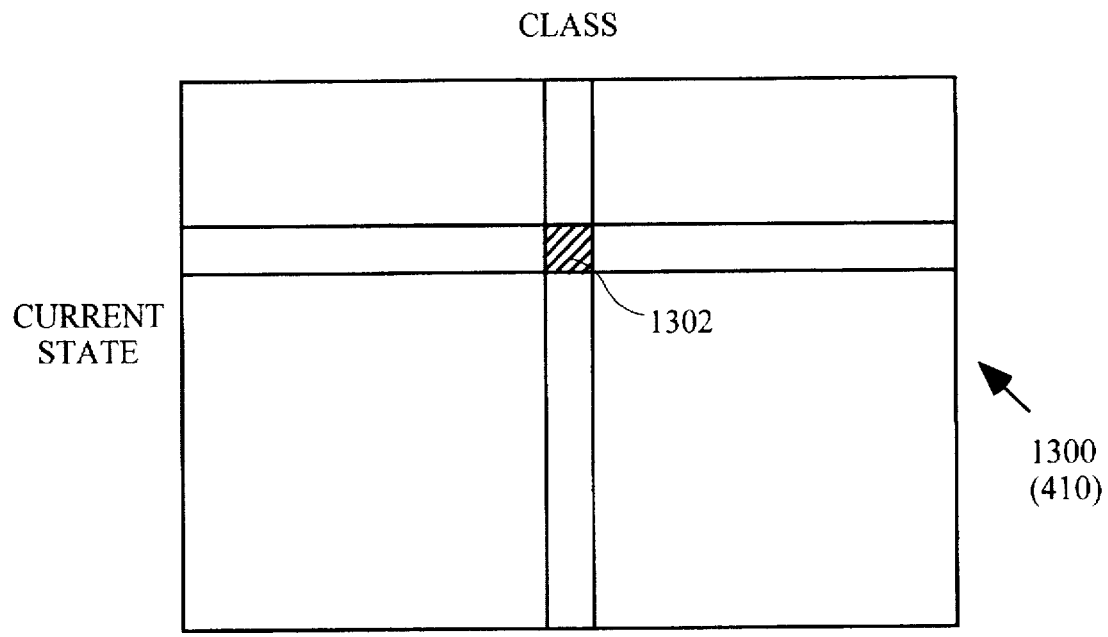
FIGS. 13A and 13B are schematic diagrams associated with a scanner table utilized by the scanner to determine the next action according to an embodiment of the invention.
Figure 13B:
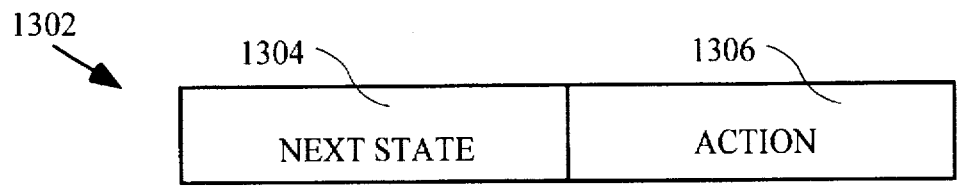

FIGS. 13A and 13B are schematic diagrams associated with a scanner table 1300 (410) utilized by the scanner 408 to determine the next action. The next action determination is invoked by block 916 of the next text element processing 900 (FIG. 9A). Recall, that the next action is used in determining the next text element. FIG. 13A illustrates a preferred format for the scanner table 1300 for use with the invention. The scanner table 1300 is a two-dimensional array having "current state" as one index and "class" as another index. The "class" refers to the class attribute. These indexes select a representative element 1302 within the scanner table 1300. FIG. 13B illustrates the representative element 1302 of the scanner table 1300. The representative element 1302 includes a next state portion 1304 containing a next state for the scanner 408, and the action portion 1306 indicates the action for the scanner 408. In effect, the scanner 408 together with the scanner table 1300 implement a state machine to determine how the scanner should operate.

The scanner table 1300 provides different next states and actions for different character encodings. FIG. 14 is a table 1400 which represents both a preferred layout and the information which would be stored in the scanner table 1300. The notations associated with the table are as follows:

Character Classes:

CC—Control character

OS—Other spacing

NS—Non-spacing

LD—Latin digit

FS—Fraction slash

JL (f)—Jamos leading consonant (filler)

JV (f)—Jamos vowel (filler)

JT—Jamos consonant trailer

NU—Not a valid Unicode character

ISS—Inhibit symmetric swapping

ASS—Activate symmetric swapping

Next States:

State 0—End, determines if text element should be returned based on states of double and half diacritics State 1—Start state State 2—Add non-spacing (diacritics)

State 3—check for numeric fraction

State 7—Korean Jamos

Actions:

Adv—[ADVANCE] advance to next character (the current may or may not be included in the current text element (TE)).

AdvMark—[ADVANCE+MARK] mark current character as last and advance to next character.

AdvMarkS—[ADVANCE+MARK+S] mark current character as last and advance to next character and set reorder flag.

AdvMarkASS—[ADVANCE+MARK+ASS] mark current character as last and advance to next character and activate symmetric swapping.

AdvMarkISS—[ADVANCE+MARK+ASS] mark current character as last and advance to next character and inhibit symmetric swapping.

End—End text element with last marked character.

NOTES—All functions check to see if reorder flag is set and reorder the non-spacing characters starting at start pointer. It is best to check the whole string because there may be more than one set of non-spacing marks which need to be reordered. Of course, after reordering the characters, the reorder flag is cleared.

Two examples of usage of the scanner table 1400 follow.
Example 1: Input string "AAB"

The character class is OS for all three characters. The first character "A" is obtained. Beginning at the start state (state 1), the first action is AdvMark and the next state is state 2. This causes the first character "A" to be included within the current text element and causes the next character (second character "A") to be obtained. Then, at state 2, the action is End and the next state is state 0. Hence, the text element includes only the first text element. The same sequencing repeats for the second and third characters of this particular input string. Thus, each of the characters of the input string is assigned to a separate, but adjacent, text element.

Example 2: Input string "AB"

The character class is OS for the first and last characters of the input string. The character class for the second character is NS because it is a combining mark. The first character "A" is obtained. Beginning at the start state (state 1), the first action is AdvMark and the next state is state 2. This causes the first character "A" to be included within the current text element and causes the next character (second character "'") to be obtained. Then, at state 2, the action is AdvMarkS and the next state is state 2. This causes the second character "'" to be included in the current text element. The third character is then obtained. The action at state 2 this time is End and the next state is state 0. Hence, the text element includes the first and second characters of the input string. The third character will be placed in its own text elements as was the case with Example 1.

Figure 15A:
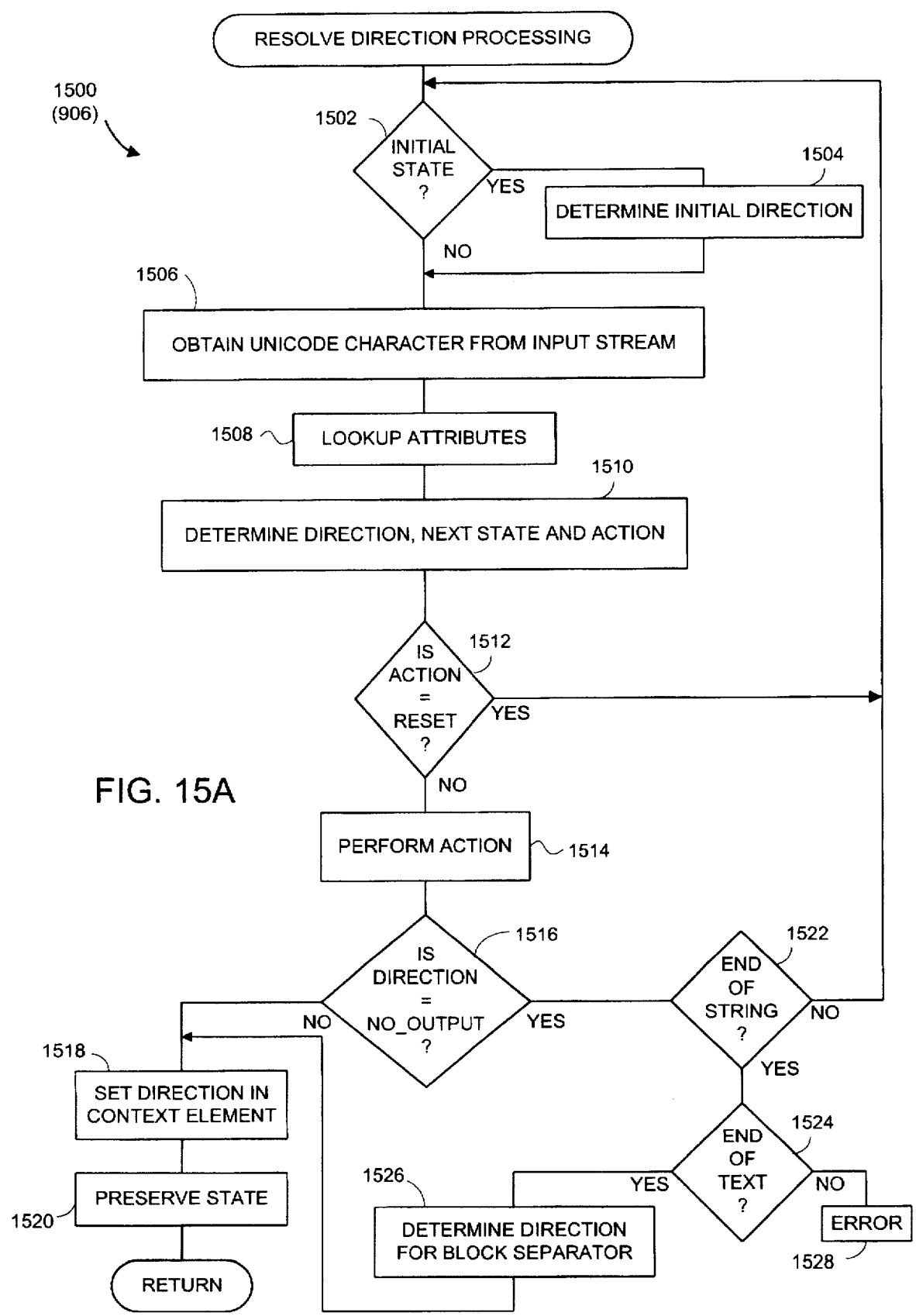
FIG. 15A is a flow chart illustrating resolve direction processing according to an embodiment of the invention.

FIG. 15 is a flow chart illustrating resolve direction processing 1500 in accordance with the invention. The resolve direction processing 1500 is the processing carried out by block 906 within the next text element processing 900 (FIG. 9A). The resolve direction processing 1500 begins with a decision 1502 which determines whether the state of direction resolved for the scanner 408 is in its initial state. In the initial state, the scanner 408 has no idea of the direction of the characters in the text element. If the state of direction resolved for the scanner 408 is in the initial state, then an initial direction for the input string is determined 1504. The processing associated with determining 1504 of the initial direction is described in detail below with reference to FIG. 16. On the other hand, when the state of direction resolved for the scanner 408 is not in the initial state, then the initial direction need not be determined. In either case, following block 1502 or block 1504, a Unicode character is obtained 1506 from the input stream. The attributes associated with the Unicode character are then looked-up 1508. The direction attribute is the important attribute for the resolve direction processing 1500. The blocks 1506 and 1508 of the resolved direction processing 1500 perform the same operations as blocks 912 and 914 of the next text element processing 900 and therefore need not be further discussed.

Next, direction, next state and action are determined 1510. The direction, next state and action are determined using the direction attribute and the current state and are obtained from a direction table using a table look-up process. The direction table is a two-dimensional array indexed by the direction attribute and the current state. The element within the direction table pointed to by the indexes includes the direction of the character, the next state, and the action the resolve direction processing 1500 is to take. The direction is one of the following: left, right, global, and $NO_{13}$ OUTPUT. The possible actions are: NO_ACTION, PUSH RO, PUSH RE, PUSH LE, PUSH LO, POP, and RESET. Because the direction may change within an input string due to explicit override characters, previous directions are stored on a direction stack. Hence, the use of "push" and "pop" refer to stack manipulation commands which are well known in the art. "RO" refers to right-to-left override, "LO" refers to left-to-right override, "RE" refers to right-to-left embedding, and "LF" refers to left-to-right embedding. Preferably, the direction table and the resolve direction processing 1500 operate as a state machine. The state machine essentially follows the bidirectional algorithm described in The Unicode Standard, Version 1.0, pp. 611–621 (Appendix A), but achieves the result with only a single pass, whereas the algorithm described in The Unicode Standard requires multiple passes.

FIGS. 15B–15D illustrate bidirectional state tables 1511 according to a preferred implementation of the bidirectional algorithm according to the invention. The bidirectional state tables 1511 implement a table-driven state machine. Each column is a single state. The states are given names suggestive of the information they record. Each row extends across FIGS. 15B–15D and is labeled by one of the following character class names.

LR strong left to right

RL strong right to left

AL Arabic letter (strong right to left)

LRE left to right embedding mark

RLE right to left embedding mark

LRO left to right override mark

RLO right to left override mark

PDF pop directional format mark

AN Arabic number

EN European number

ET European number terminator

ES European number separator

CS common number separator

ON other neutral character

BS block separator

Each cell in the bidirectional state tables 1511 represents a transition with associated actions and outputs. The cells contain the name of the new state, an optional action to be taken, and an output, if any. The new state may depend on the current global direction. This is indicated by having a (G) in the new state name. It is an error to make one of these transitions when the global direction is unknown. The possible actions are as follows:

push push a new embedding state onto the embedding stack. The actual value to be pushed depends on the actual embedding control encountered. In the implementation, there are 4 different action verbs to handle this.

pop pop the current embedding state off the stack and make the new top of stack the current embedding state. If the new embedding is an override, a transition is made to the OR state instead of the target state given in the cell.

reset clear the embedding stack and go to START without consuming a character, i.e., make an epsilon transition. There is no output on a reset.

error generate an immediate error.

Outputs are either L or R, meaning left-to-right and right-to-left, respectively, G, meaning output the current global direction, or ●, meaning no output. A transition that has an output terminates the scan. The machine may be entered in any state with an name that does not begin with a lower-case 's'. The START state is intended for a new block of text. The sDIR state is used as an entry point for determining the global direction. It should be possible to make this calculation simultaneously with the main scan, but it is separated for simplicity.

Returning to FIG. 15A, following block 510, a decision 1512 is then made based on whether the action is "RESET". If the action is "RESET", then processing returns to the beginning of the resolve direction processing 1500. Otherwise, the resolve direction processing 1500 continues. Namely, following the decision 1512, the action is performed 1514.

Next, a decision 1516 is made based on whether the direction (determined in block 1510) is "NO_OUTPUT". When the direction is not equal to "NO_OUTPUT", then the direction is set 1518 in the context (for each instance), and the state is preserved 1520. Following block 1520, the resolve direction processing 1500 is complete and returns.

However, in the case when the decision 1516 determines that the output is "NO_OUTPUT", then a decision 1522 is made based on whether the entire input string has been processed. If the entire input string has not been processed, then processing returns to the beginning of the resolve direction processing 1500 so that an additional Unicode character can be obtained and processed because so far the direction of the text element has not been determined. On the other hand, when the decision 1522 determines that the entire input string has been processed, then a decision 1524 determines whether the processing has reached the end of the text. That is, whether the text to be converted to the target encoding has been completely processed by the resolve direction processing 1500. If there is additional text to be converted, then an error results 1528 because no direction could be computed for the current character of the input string. However, if there is no additional text, then the direction for a block separator is determined 1526 from the overall direction of the block (see 1504). Following block 1526, blocks 1518 and 1520 are performed as previously described and then the resolve direction processing 1500 is complete and returns.

Figure 16:
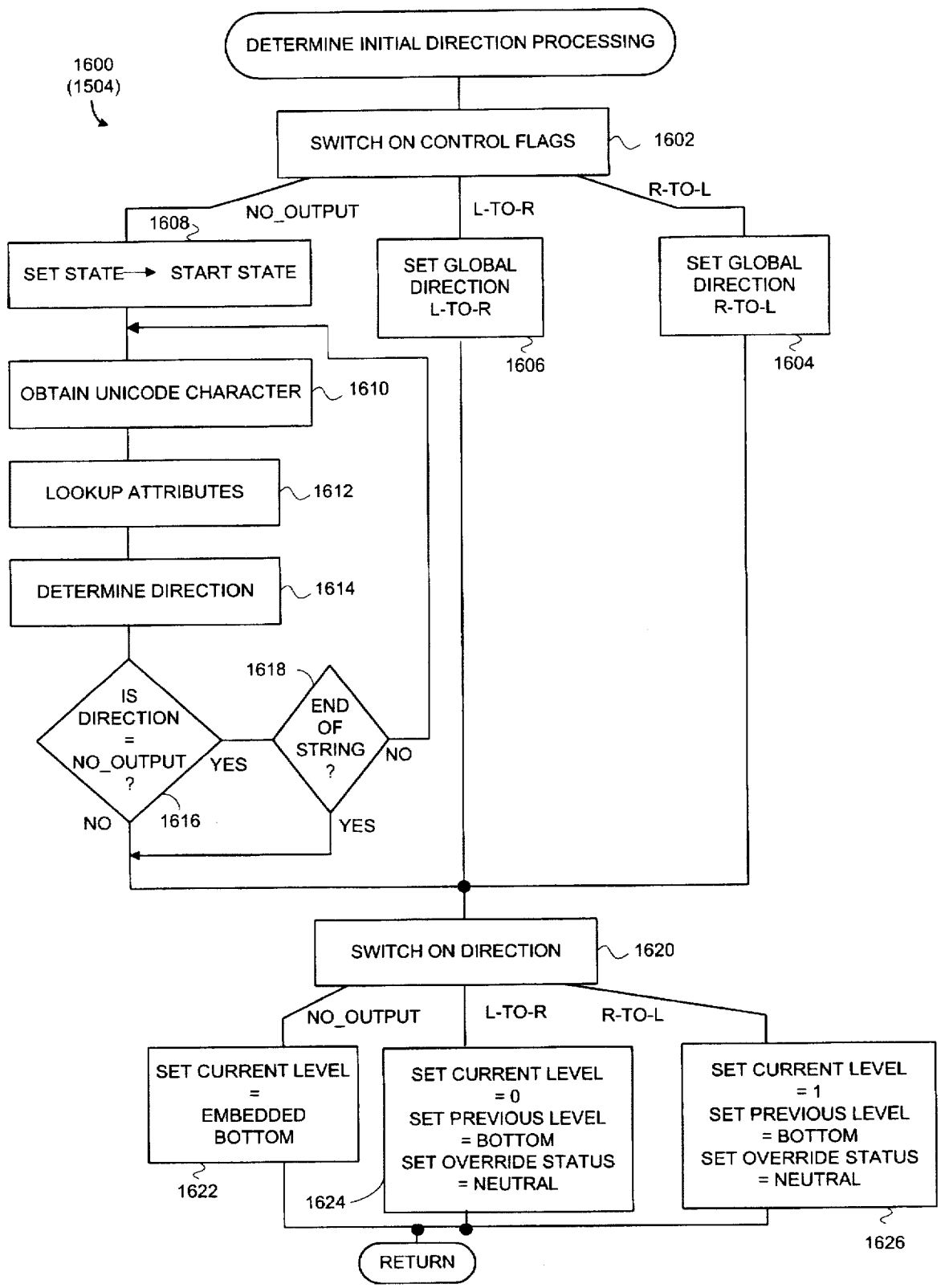
FIG. 16 is a flow chart of determine initial direction processing according to an embodiment of the invention.

FIG. 16 is a flow chart of determine initial direction processing 1600. The determine initial direction processing 1600 is associated with the operations performed by block 1504 in FIG. 15.

The determine initial direction processing 1600 begins with a switch operation 1602 based on control flags. The control flags indicate one of: NO_OUTPUT, L-to-R, or R-to-L. These control flags are set by the application which invokes the Unicode code conversion system 400 (i.e., the control flags are inputs to the converter). In the case when the control flags indicate R-to-L, the global direction is set 1604 to R-to-L. When the control flags are set to L-to-R, then the global direction is set 1606 to L-to-R. When the control flags are set to NO_OUTPUT, then a small loop is initiated to scan through the Unicode characters of the input string until the direction can be determined. The loop begins by setting 1608 the state to "START STATE". Next, a Unicode character is obtained 1610 from the input string. The attributes for the Unicode character are then looked-up 1612. The attributes are looked-up 1612 using the same approach used in block 914 of FIG. 9A and described in detail in FIG. 12. The direction of the Unicode character is then determined 1614 using the attributes (namely, the direction attribute). A decision 1616 is then made based on whether the direction is equal to "NO_OUTPUT". If the direction is "NO_OUTPUT", then a decision 1618 is made based on whether the end of the input string has been reached. If the end of the input string has not been reached, then the processing returns to repeat blocks 1610–1618. Once the end of the string is reached, decision 1618 causes the special direction scanning loop to complete without finding the direction (e.g., NO_OUTPUT). Alternatively, the scanning loop completes when the decision 1616 determines the direction.

In any case, following the direction processing associated with the switch operation 1602, a switch operation 1620 is invoked based on the direction. When the direction determined is "NO_OUTPUT", then the current level is set 1622 to embedded bottom. On the other hand, if the direction is L-to-R, then the current level is set to zero, the previous level is set to bottom, and the override status is set to neutral 1624. When the direction is R-to-L, then the current level is set to 1, the previous level is set to bottom, and the override status is set to neutral 1626. The levels refer to embedding levels as described in The Unicode Standard. Although the special direction scanning loop (e.g., 1610–1618) of determine initial direction processing 1600 is illustrated as a separate loop in FIG. 16, the overall system processing efficiency could be improved by incorporating the special direction scanning loop within the main direction scanning loop.

Figure 17:
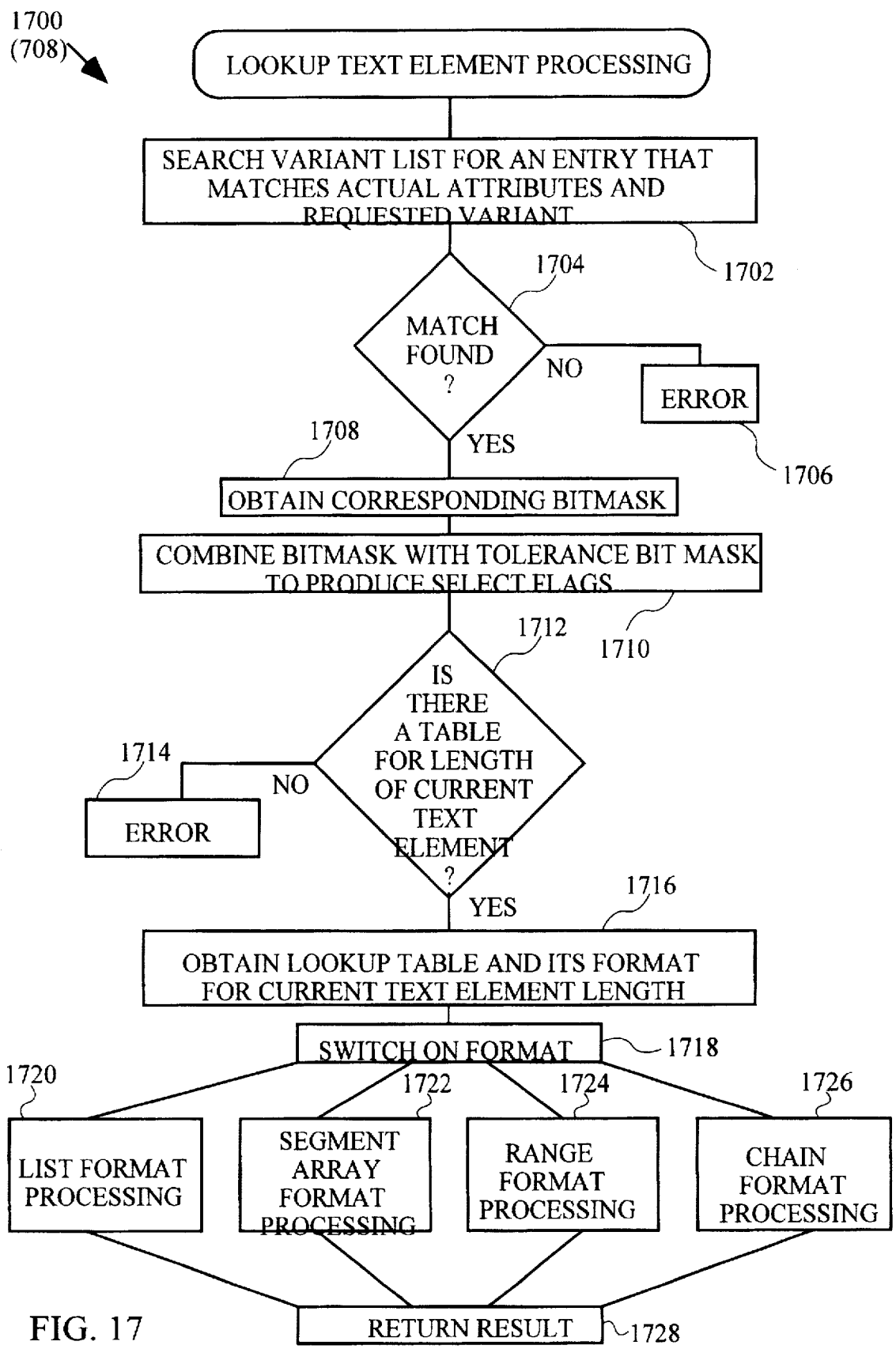
FIG. 17 is a flow chart of lookup text element processing according to an embodiment of the invention.

FIG. 17 is a flow chart of lookup text element processing 1700. The lookup text element processing 1700 is performed by the lookup handler 412 and is invoked by the block 708 within the Unicode converter processing 700 (FIG. 7).

The lookup text element processing 1700 begins by searching 1702 a variant list for an entry that matches actual attributes and requested variant. The searching 1702 of the variant is described in detail below with reference to FIG. 22. Next, a decision 1704 is made based on whether a match was found. If no match was found, then an error results 1706. On the other hand, if a match is found, then the corresponding bit mask is obtained 1708 from the variant list. Preferably, the variant list contains three fields: a variant identifier, a set of attributes, and a bit mask. If the variant identifier and the set of attributes within the variant list match the actual attributes and the requested variant, then the corresponding bit mask is chosen from the variant list. Following block 1708, the bit mask is combined 1710 with a tolerance bit mask to produce select flags. The select flags form the selection mask used in selecting the subtables of the mapping table 414 as was discussed above. Preferably, the combining 1710 is a bitwise operation. Next, a decision 1712 is made based on whether there is a table within the mapping table 414 for the length of the current text element. If not, an error results 1714. On the other hand, if there is a table available for the length of the current text element, the lookup table and its format are obtained 1716 for the current text element length. Then, a switch operation 1718 is performed on the format. The formats available in this implementation are: list, segment array, range and chain. If the format is a list format, then list format processing 1720 is performed. If the format is segment array, then segment array format processing 1722 is performed. If the format is range, then range format processing is performed 1724. If the format is chain, then chain format processing 1726 is performed. Following blocks 1720–1726, the result is returned 1728, thereby completing the lookup text element processing 1700.

Figure 18:
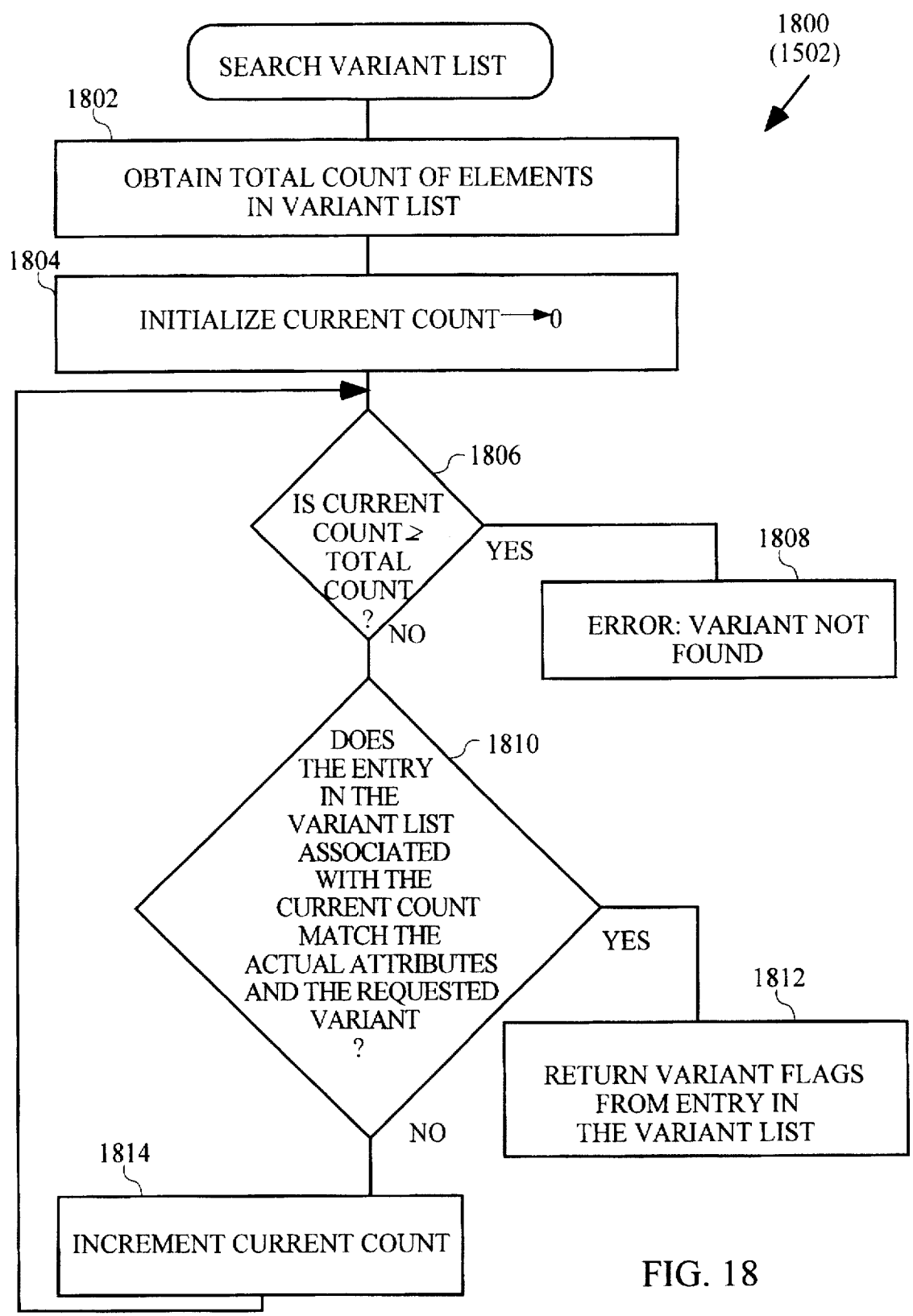
FIG. 18 is a flow chart illustrating search variant list processing according to an embodiment of the invention.

FIG. 18 is a flow chart illustrating search variant list processing 1800. The search variant list processing 1800 is processing performed by block 1702 in FIG. 17. In other words, the search variant list processing 1800 is part of the lookup text element processing 1700 performed by the lookup handler 412 in conjunction with the mapping table 414.

The search variant list processing 1800 obtains 1802 a total count of elements in the variant list. Then, the current count is initialized to zero 1804. A decision 1806 is then made based on whether the current count is greater than or equal to the total count. If the current count is greater than or equal to the total cunt, then the search variant list processing 1800 returns 1808 with an error code indicating the variant not found. On the other hand, if the current count is not greater than or equal to the total count, then a decision 1810 is performed based on whether the entry in the variant list associated with the current cunt matches the actual attributes and the requested variant. If they do match, then the variant flags from the entry in the variant list are returned 1812. Otherwise, the current count is incremented 1814 and then the processing returns to block 1806 to continue to loop through the available variants in the variant list until either one matches or all of the variants have been considered.

Figure 19A:
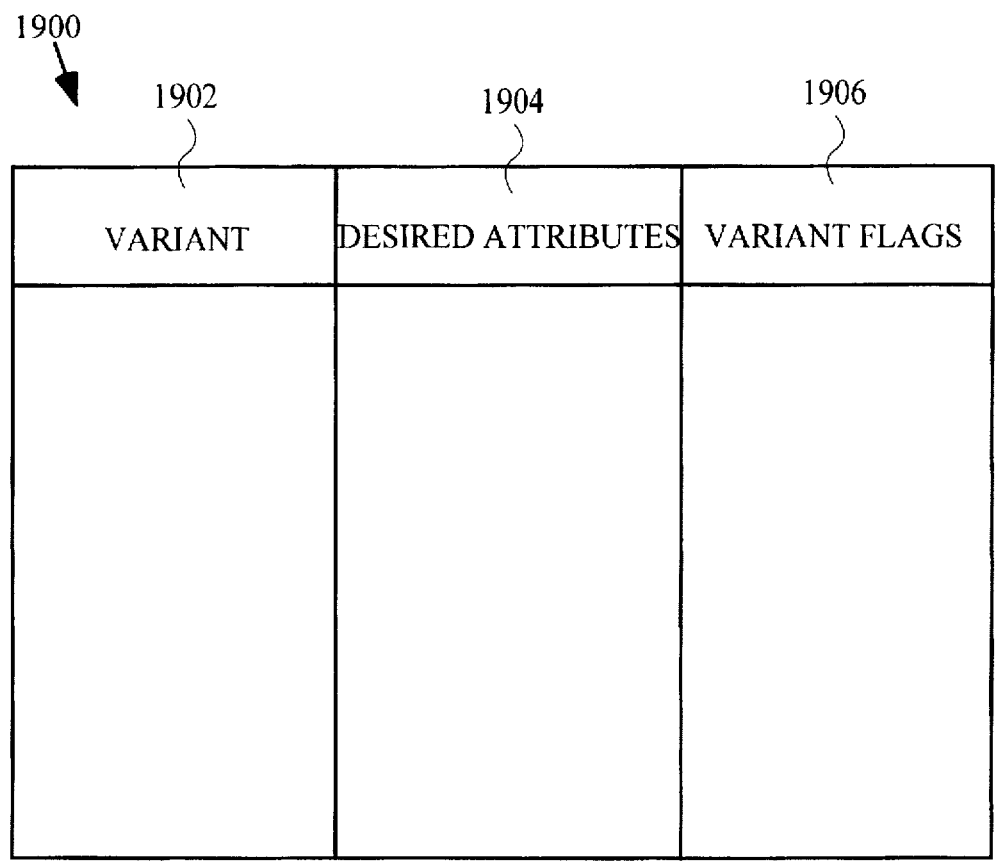
FIGS. 19A and 19B are schematic diagrams of tables and data formats associated with the variant list processing according to an embodiment of the invention.
Figure 19B:
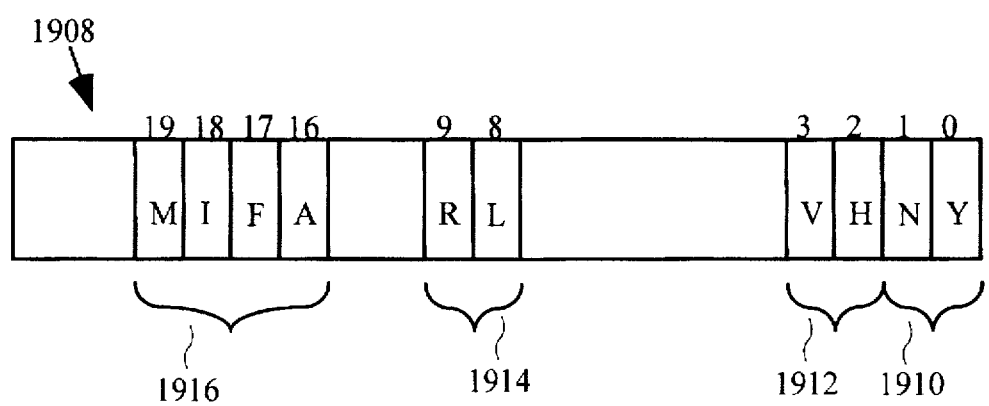

FIGS. 19A and 19B are schematic diagrams of the variant list 1900. As shown in FIG. 19A, the variant list 1900 includes a variant region 1902, a desired attributes region 1904, and variant flags region 1906. FIG. 19B illustrates an actual attributes bit mask in accordance with a preferred implementation. The actual attributes bit mask 1908 is a 32-bit variable having a first portion 1910 (bits 0 and 1) indicating the symmetric swapping state, a second portion 1912 (bits 2 and 3) indicating vertical or horizontal forms, a third portion 1914 (bits 8 and 9) indicating resolved direction, and a fourth portion 1916 (bits 16–19) indicating context. Each bit within a portion represents a flag. The bits contain the value "0" if the flag is unknown or not set and contains the value "1" when set. The caller sets the second portion 1910, and the scanner 408 sets the first, third and fourth portions 1910, 1914 and 1916.

A desired attributes bit mask is formatted like the actual attributes bit mask but sets the bits depending on which of the attributes is important to obtain the correct mapping for the particular table and variant (as determined by the design of the mapping table 414). The bits in the desired attributes bit mask are set to "1" for each attribute to be considered in making the mapping determination, but if all bits of a portion are set to "1", the attribute is ignored during mapping. For example, if bit 0 is "1" and bit 1 is "0", then symmetric swapping is on and will be considered when mapping is performed. On the other hand, if both bits 0 and 1 are "1", symmetric swapping is completely ignored. The remaining unused bits of the desired attributes bit mask are set to "1" and can be later assigned values if needed. A few examples of the desired attributes bit mask follow.

Suppose the direction is to be left-to-right and none of the other attributes matter. Then the desired attribute bit mask would be: xFFFFFDFF. Whereas, if the direction is to be right-to-left, with symmetric swapping on, the desired attribute bit mask would be: xFFFFFEFD. If the direction is to be right-to-left, with symmetric swapping off, the desired attribute bit mask would be: xFFFFFEFE. With each of the above different desired attribute bit mask, a different conversion code could be selected. For example, in mapping the Unicode character u0028 to MacArabic, yields x28 for the desired attribute bit mask xFFFFFDFF, xA8 for the desired attribute bit mask xFFFFFEFD, and xA9 for the desired attribute bit mask xFFFFFEFE.

Figure 20:
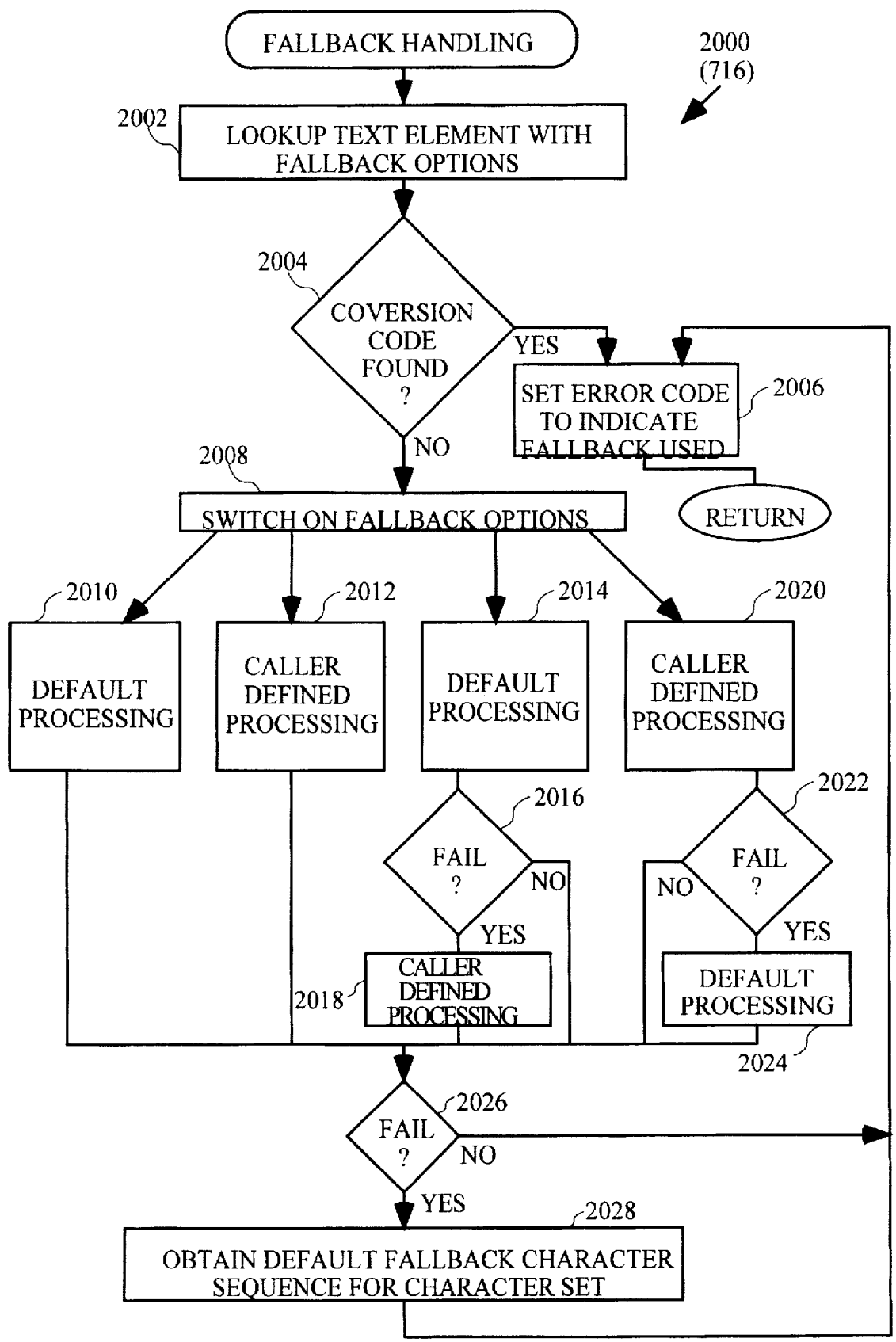
FIG. 20 is a flow chart illustrating fallback handling processing in accordance with an embodiment of the invention.

FIG. 20 is a flow chart illustrating fallback handling processing 2000 in accordance with the invention. The fallback handling processing 2000 is the processing performed by the fallback handler 416 and invoked by block 716 of the Unicode converter processing 700 shown in FIG. 7.

The fallback handling processing 2000 looks-up 2002 the text element with fallback options. The lookup 2002 is similar to the lookup text element processing 1700 described above with respect to FIG. 17. The only significant difference is that now the fallback options are set so that additional subtables are considered via the select flags which have changed. Next, a decision 2004 is made based on whether conversion code for the text element was found. If conversion code was found, then an error code is set 2006 to indicate what fallback was used in obtaining the conversion or mapping. Following block 2006, the fallback handling processing 2000 is complete and returns.

On the other hand, when the decision 2004 indicates that the conversion code is not found, then a switch operation 2008 is performed based on the fallback options. The fallback options are: default, caller defined, default followed by caller defined, or caller defined followed by default. If the fallback option is default, then the switch operation 2008 causes default processing 2010 to be performed. If the fallback option is caller defined, then the switch operation 2008 causes caller defined processing 2012 to be performed. If the fallback option is default followed by caller defined, then the switch operation 2008 causes the default processing to be performed 2014, followed by a decision 2016 and caller defined processing 2018. The decision 2016 operates to bypass the caller defined processing 2018 when a default processing 2014 is successful. If the fallback option is caller defined followed by default processing, then the switch operation 2008 causes caller defined processing to be performed 2020, followed by a decision 2022 and default processing 2024. The decision 2022 operates to bypass the default processing 2024 when the caller defined processing 2020 is successful. Following the processing associated with the switch operation 2008, a decision 2026 is made based on whether the fallback processing 2000 has successfully identified a mapping or conversion code. If the fallback processing 2000 has been unsuccessful, then a default fallback character sequence for the character set is obtained 2028. The default fallback character sequence is the conversion code(s) used when fallback lookup 2002 fails to identify a conversion code. Preferably, the default fallback character sequence is contained within the header of the mapping tables 414. For example, for ASCII, the default fallback character is typically "?". Then, following block 2028 or following decision block 2026 in the case when the fallback processing was successful in obtaining a mapping or conversion code, an error code to indicate fallback options have been used is set 2006 and the fallback handling processing 2000 is complete and returns.

Figure 21:
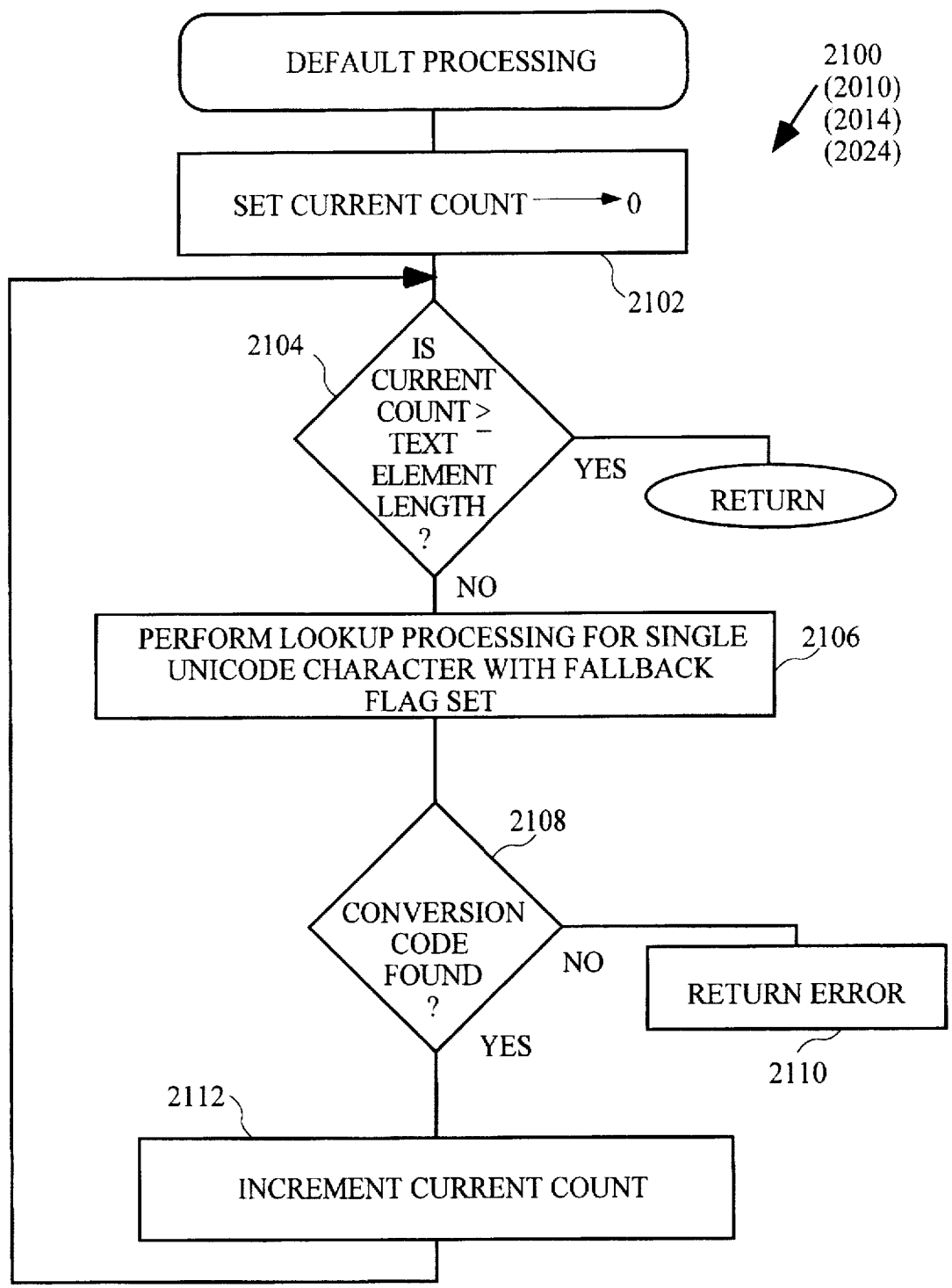
FIG. 21 is a flow chart illustrating default processing according to an embodiment of the invention.

FIG. 21 is a flow chart illustrating default processing 2100. The default processing 2100 is associated with the processing carried out by blocks 2010, 2014 and 2024 in FIG. 20.

A default processing 2100 initially sets 2102 a current count to zero Next, a decision 2104 is made based on whether the current count is greater than or equal to the text element length. If it is, then the default processing 2100 is complete and returns. Otherwise, lookup processing is performed 2106 for a single Unicode character with fallback flags set. Here, the lookup is for individual characters of the text element, whereas before (block 2002) the lookup was for the entire text element. Then, a decision 2108 is made based on whether conversion code for the single Unicode character has been found. If not, then the default processing 2100 returns 2110 with an error code indicating that no individual mapping was available for the Unicode character. On the other hand, if a code conversion was found, then the current count is incremented 2112 and processing returns to block 2104 for processing of the next Unicode character within the text element.

Although FIGS. 4-21 discussed above pertain to converting from Unicode to a target encoding (From-Unicode), as mentioned above the Unicode code conversion system 300 is equally able to convert to Unicode from a different source encoding (To-Unicode). The To-Unicode processing is similar to the processing for From-Unicode but is substantially less complex. The To-Unicode processing usually does not need to scan for text elements or lookup multiple character sequences in determining the target encodings. Instead, the To-Unicode processing need only break the source string into individual characters and then find the corresponding code point in Unicode. However, in the rare case in which a mapping for a character can be influenced by the character that follows it (e.g., In Indic such as Devanagari, for example), scanning may be performed as discussed above.

Figure 22:
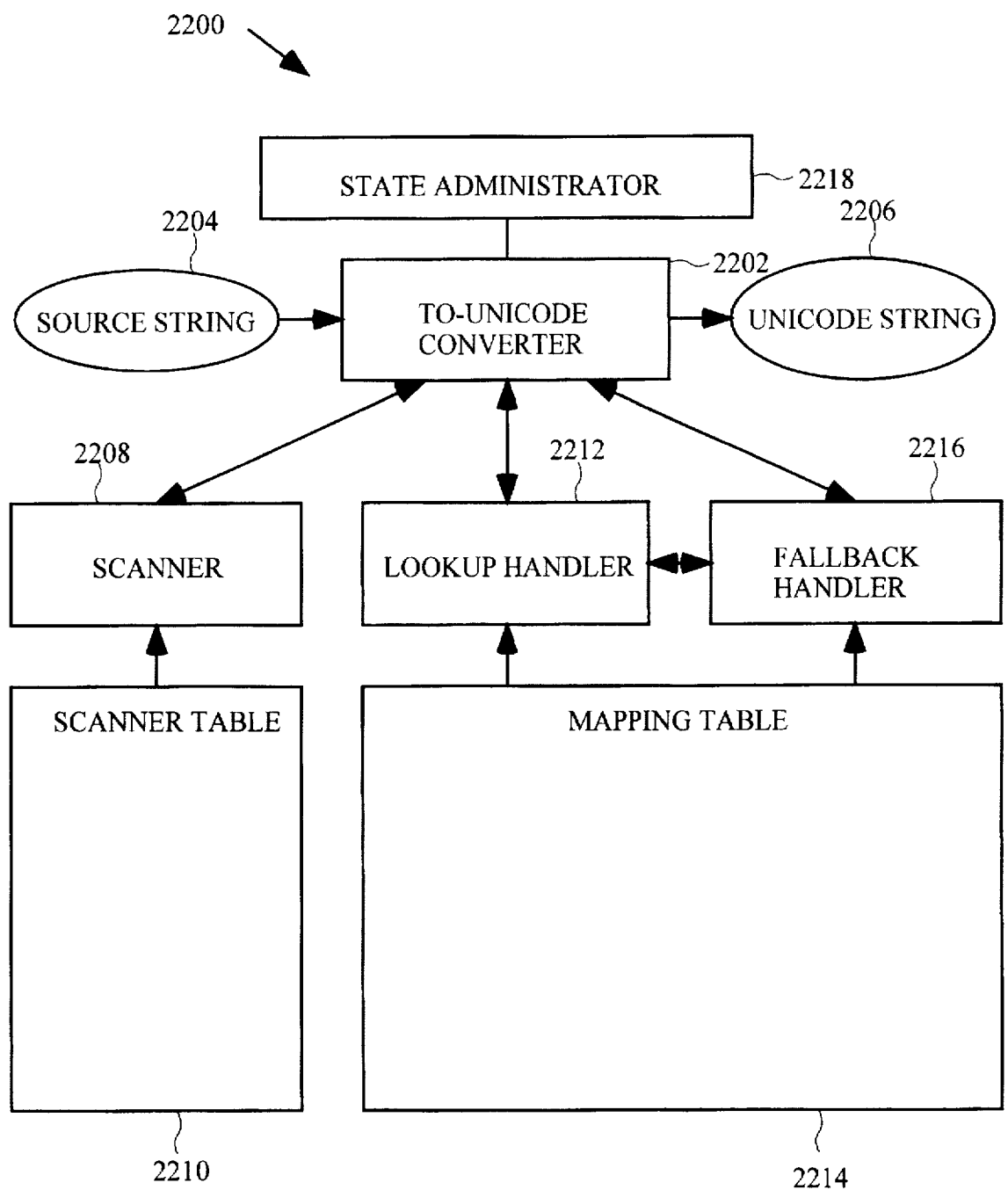
FIG. 22 illustrates a block diagram of an embodiment of a To-Unicode code conversion system according to an embodiment of the invention.

FIG. 22 illustrates a block diagram of an embodiment of a To-Unicode code conversion system 2200 according to the invention. The Unicode code conversion system 2200 converts to Unicode (i.e., To-Unicode processing). The Unicode code conversion system 2200 includes a To-Unicode converter 2202 which receives a source string 2204 and produces a Unicode string 2206. The To-Unicode converter 2202 performs the code conversion process via To-Unicode converter 2202 which interacts with a scanner 2208. The scanner 2208 in conjunction with the scanner table 2210 scans the source string 2204 to chunk the source string 2204 into characters. Here, unlike the From-Unicode situation, the source string is simply divided into individual characters. The To-Unicode converter 2202 then uses a lookup handler 2212 to look up the individual characters so as to obtain Unicode encodings therefor. The lookup handler 2212 uses the mapping table 2214 to obtain the character in Unicode. Additionally, the To-Unicode converter 2202 may also use a fallback handler 2216. The fallback handler 2216 operates together with the mapping table 2214 to identify one or more characters in the target encoding that are able to be used as a fallback mapping for the text element in cases where the lookup handler 2212 has been unable to identify a Unicode character.

The scanner 2208, the scanner table 2210, the lookup handler 2212, the mapping table 2214, the fallback handler 2216 and the state administrator 2218 are similar, but substantially less complex, than the corresponding devices in FIG. 4. Hence, these devices can be designed to implement both To-Unicode and From-Unicode processing. Further, when a given computer system or other electronic device is capable of performing both the To-Unicode and the From-Unicode processing, the computer system or other electronic device can operate as a hub. The hub could then operate to convert between various national character sets supported by Unicode. For example, a source national character set would first be converted to Unicode, and then converted to a target national character set.

Additional details on the code conversion system are contained in commonly-assigned and concurrently filed U.S. patent application Ser. No. 08/527,438, entitled "UNICODE CONVERTER", which is hereby incorporated by reference.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described.

Hence, all suitable modifications and equivalents may be resorted to as falling within the scope of the invention.

What is claimed is:

1. A computer implemented method for converting a source string into a target string, said method comprising:
    (a) receiving a source string having a first character encoding, the source string including a plurality of source characters;
    (b) determining a direction for the source characters of the source string, the direction determined for each of the source characters takes into consideration one or more previously determined directions for preceding source characters in the source string, the one or more previously determined directions for preceding source characters in the source string being stored in a direction stack, the direction stack being used to assist in determining the direction for each of the source characters;
    (c) looking up in a mapping table a conversion code associated with a second character encoding for each of the source characters based on the first character encoding and the direction determined; and
    (d) combining the conversion codes for the source characters so as to form a target string of the second character encoding.

2. A method as recited in claim 1, wherein the direction of each source character can be one of a left-to-right direction and a right-to-left direction.

3. A method as recited in claim 1, wherein said determining (b) comprises:
    (b1) determining whether the direction is irrelevant; and
    (b2) when the direction is relevant, determining whether the direction is one of a left-to-right direction and a right-to-left direction.

4. A method as recited in claim 1, wherein said determining (b) determines the direction for all or parts of the source string based on the direction of one or more characters of the source string.

5. A method as recited in claim 1, wherein said determining (b) comprises:
    (i) looking up attributes associated with the source character, the attributes including at least a class indicator; and
    (ii) determining the direction of the source character based on the class indicator.

6. A method as recited in claim 1, wherein said determining (b) comprises:
    (i) looking up attributes associated with the source character, the attributes including at least a class indicator;
    (ii) providing a state machine having a plurality of states, the state machine being used to determining the direction of the source character based on the class indicator and a state of the state machine; and
    (iii) updating the state of the state machine.

7. A method as recited in claim 6, wherein the state machine is further for determining whether the source character should be included within a current text element or alternatively begin a new next text element based on the class indicator and a current state of the state machine.

8. A method as recited in claim 6, wherein said determining (b) determines the direction of the current text element.

9. A method as recited in claim 1, wherein said method further comprises (e) sequentially dividing the source string into text elements, each text element including one or more characters of the source string.

wherein said determining (b) determines the direction of the text element, and wherein said looking up (c) looks up in the mapping table a conversion code associated with the second character encoding for each of the text elements based on the first character encodings of the one or more source characters of the text elements and the direction of the text elements.

10. A method as recited in claim 9, wherein the mapping table includes regular mappings and fallback mappings, and wherein said looking up (c) determines the conversion code for the text element using the fallback mappings when the mapping table does not contain a conversion code for the text element using the regular mappings.

11. A method as recited in claim 9, wherein each of the source characters has a character class associated therewith, and wherein said dividing (e) is based at least in part on the character class of the source characters within the source string.

12. A method as recited in claim 1, wherein one of the first character encoding and the second character encoding conforms to The Unicode Standard.

13. A code conversion system for converting a source string to a target string, said system comprising:

a converter for controlling the conversion of the input string having a source character encoding into the target string having a target character encoding, the input string including a plurality of characters;

a scanner, operatively connected to said converter, for determining a direction of the characters in the input string, the direction determined for each of the characters is based at least in part on previously determined directions with respect to the source string;

a direction stack said direction stack stores one or more previously determined directions for preceding characters in the source string and assists said scanner in determining the direction for each of the source characters;

a mapping table for storing target encodings for characters of the source encoding; and a lookup handler, operatively connected to said converter and said mapping table, for looking up in said mapping table a conversion code associated with a target character encoding for each of the characters in the input string based on the direction and the source encoding for the characters in the input string.

14. A code conversion system as recited in claim 13, wherein said scanner further divides the input string into text elements, each text element including one or more characters of the input string, wherein said scanner determines the direction of the text elements;

wherein said mapping table stores target encodings for text elements of the source encoding, and wherein said lookup handler looks up the target character encoding for each of the text elements based on the direction and the source encoding for the characters in the text elements.

15. A code conversion system as recited in claim 14, wherein said system further comprises:

a fallback handler, operatively connected to said converter, for providing fallback conversion codes in certain cases, when said lookup handler is unable to provide a conversion code for one or more text elements, the fallback conversion codes contain one or more code points in the target encoding that are not exactly equivalent to the characters in the text element but have a graphical appearance that is similar.

16. A code conversion system as recited in claim 15, wherein said system further comprises:

scanner table means for assisting said scanner in determining the direction of the characters of the input string and whether individual characters in the input string should be included within a current text element or alternatively begin a new next text element.

17. A code conversion table as recited in claim 13, wherein the characters of the input string have a character class associated therewith, and wherein said scanner table comprises an array of elements, said array being indexed by character class.

18. A code conversion system as recited in claim 13, wherein the characters in the source string are Unicode characters.

19. A code conversion system as recited in claim 13, wherein the characters in the target string are Unicode characters.

20. A code conversion system for converting a source string to a target string, said system comprising:

converter means for controlling the conversion of the source string having a source character encoding into the target string having a target character encoding;

state machine means for determining a direction for each of the source characters in the source string, said state machine takes into consideration one or more previously determined directions for preceding source characters in the source string;

a direction table, said direction table assists said state machine means in determining the direction for each of the source characters said direction table being indexed by a direction attribute and a current state of said state machine means;

mapping means for storing target character encodings for characters of the source character encoding; and lookup handler means for looking up in said mapping means a conversion code associated with a target character encoding for each of the characters in the source string in accordance with the source character encoding while taking the determined direction into consideration.

21. A code conversion system as recited in claim 20, wherein said state machine means further divides the source string into text elements, each text element including one or more characters of the source string.

22. A code conversion system as recited in claim 21, wherein said code conversion system further comprises:

fallback handler means for providing fallback conversion codes in certain cases, when said lookup handler means is unable to provide a conversion code for one or more text elements, the fallback conversion codes contain one or more code points in the target encoding that are not exactly equivalent to the characters in the text element but have a graphical appearance that is similar.

23. A code conversion system as recited in claim 22, wherein said system further comprises:

a direction stack, said direction stack stores one or more previously determined directions for preceding source characters in the source string and assists said state machine means in determining the direction for each of the source characters.

24. A computer readable medium containing program instructions for converting a source string into a target string, said computer readable medium comprising:

first computer readable code configured to cause a computer to effect receiving a source string having a first character encoding;

second computer readable code configured to cause a computer to effect determining a direction for each of the source characters in the source string and to effect dividing the source string into text elements, each text element including one or more characters of the source string, the direction determined for each of the source characters takes into consideration one or more previously determined directions for preceding source characters in the source string;

third computer readable code configured to cause a computer to effect looking up in a conversion code associated with a second character encoding for each of the text elements;

fourth computer readable code configured to cause a computer to effect combining the conversion codes for the text elements so as to form a target string of the second character encoding; and fifth computer program code configured to form a direction stack that stores one or more previously determined directions for preceding source characters in the source string, the direction stack being used to assist said second computer program code in determining the direction for each of the source characters.

25. A computer readable medium as recited in claim 24, wherein said second computer program code configured to determines whether the direction is irrelevant, and when the direction is relevant, determines whether the direction is one of a left-to-right direction and a right-to-left direction.

26. A computer readable medium as recited in claim 24, wherein said second computer program code is further configured for performing the operations of: (i) looking up attributes associated with the source character, the attributes including at least a class indicator, and providing a state machine having a plurality of states, the state machine being used to determining the direction of the source character based on the class indicator, the direction stack and a state of the state machine.

* * * * *